United States Patent
Pezaris

(10) Patent No.: US 11,561,771 B2
(45) Date of Patent: Jan. 24, 2023

(54) SYSTEM AND METHOD FOR IN-IDE CODE REVIEW

(71) Applicant: CodeStream, Inc., New York, NY (US)

(72) Inventor: Peter Pezaris, New York, NY (US)

(73) Assignee: CodeStream, Inc., New York, NY (US)

(*) Notice: Subject to any disclaimer, the term of this patent is extended or adjusted under 35 U.S.C. 154(b) by 181 days.

(21) Appl. No.: 17/141,216

(22) Filed: Jan. 4, 2021

(65) Prior Publication Data

US 2021/0124561 A1     Apr. 29, 2021

Related U.S. Application Data

(63) Continuation-in-part of application No. 16/996,867, filed on Aug. 18, 2020, which is a continuation of
(Continued)

(51) Int. Cl.
  *G06F 8/75* (2018.01)
  *G06F 8/77* (2018.01)
  (Continued)

(52) U.S. Cl.
  CPC ............ *G06F 8/33* (2013.01); *G06F 8/41* (2013.01); *G06F 8/71* (2013.01); *G06F 8/75* (2013.01);
  (Continued)

(58) Field of Classification Search
  CPC ..... G06F 8/33; G06F 8/41; G06F 8/71; G06F 8/75; G06F 8/77; G06F 8/20; G06F 8/30;
  (Continued)

(56) References Cited

U.S. PATENT DOCUMENTS

| 6,993,710 B1 | 1/2006 | Coad et al. |
| 7,810,069 B2 | 10/2010 | Charisius et al. |

(Continued)

FOREIGN PATENT DOCUMENTS

WO          03038607 A1      5/2003

OTHER PUBLICATIONS

Nick C. Bradley et al., Context-Aware Conversational Developer Assistants, 2018 IEEE, [Retrieved on Aug. 24, 2022]. Retrieved from the internet: <URL: https://ieeexplore.ieee.org/stamp/stamp.jsp?tp=&arnumber=8453178> 11 Pages (993-1003) (Year: 2018).*

(Continued)

*Primary Examiner* — Anibal Rivera
(74) *Attorney, Agent, or Firm* — Cognition IP, P.C.; Edward Steakley

(57) ABSTRACT

Methods, system and apparatus for the augmentation of an integrated development environment (IDE). The system and methods provide for the integration of all aspects of a development workflow to be initiated and completed from within the IDE. Every phase of development, including, grabbing a ticket, working on the ticket, asking teammates questions, requesting feedback, initiating code reviews, performing code reviews, creating feature branches, creating pull requests, creating merge requests and generating audit trails of all interactions users have with the IDE are managed and performed from within the IDE, eliminating the need to context switch or open additional application or websites.

15 Claims, 18 Drawing Sheets

Related U.S. Application Data application No. 16/312,785, filed as application No. PCT/US2018/047404 on Aug. 22, 2018, now Pat. No. 10,782,937.

(60) Provisional application No. 62/659,346, filed on Apr. 18, 2018, provisional application No. 62/626,575, filed on Feb. 5, 2018, provisional application No. 62/548,776, filed on Aug. 22, 2017.

(51) Int. Cl.
| | | |
|---|---|---|
| *G06F 9/44* | (2018.01) | |
| *G06F 8/33* | (2018.01) | |
| *G06F 8/71* | (2018.01) | |
| *G06F 8/41* | (2018.01) | |
| *G06F 8/20* | (2018.01) | |
| *G06F 8/30* | (2018.01) | |
| *G06F 8/10* | (2018.01) | |
| *G06F 11/36* | (2006.01) | |
| *G06F 8/34* | (2018.01) | |
| *G06F 8/70* | (2018.01) | |

(52) U.S. Cl.
CPC .................. *G06F 8/77* (2013.01); *G06F 8/10* (2013.01); *G06F 8/20* (2013.01); *G06F 8/30* (2013.01); *G06F 8/34* (2013.01); *G06F 8/70* (2013.01); *G06F 11/36* (2013.01); *G06F 11/3604* (2013.01); *G06F 11/3664* (2013.01)

(58) Field of Classification Search
CPC ..... G06F 8/10; G06F 8/34; G06F 8/70; G06F 11/36; G06F 11/3604; G06F 11/3608; G06F 11/3664; G06F 3/0482; G06F 3/04842
See application file for complete search history.

(56) References Cited

U.S. PATENT DOCUMENTS

| | | | |
|---|---|---|---|
| 8,453,112 | B1 | 5/2013 | Brambley et al. |
| 9,086,885 | B2 | 7/2015 | Canter et al. |
| 9,348,579 | B2 | 5/2016 | Xia et al. |
| 9,652,225 | B1 | 5/2017 | Bohn et al. |
| 9,910,837 | B2 | 3/2018 | Kumarasamy Mani et al. |
| 10,503,822 | B1 | 12/2019 | Spencer et al. |
| 2004/0205200 | A1 | 10/2004 | Kothari et al. |
| 2005/0114475 | A1 | 5/2005 | Chang et al. |
| 2006/0026251 | A1 | 2/2006 | Cheng et al. |
| 2006/0041440 | A1 | 2/2006 | Cheng et al. |
| 2006/0206860 | A1 | 9/2006 | Dardinski et al. |
| 2007/0283321 | A1 | 12/2007 | Hegde et al. |
| 2008/0005235 | A1 | 1/2008 | Hegde et al. |
| 2008/0086718 | A1 | 4/2008 | Bostick et al. |
| 2008/0134298 | A1 | 6/2008 | Nathan et al. |
| 2008/0244418 | A1 | 10/2008 | Manolescu et al. |
| 2009/0064102 | A1 | 3/2009 | Barcia et al. |
| 2009/0103902 | A1 | 4/2009 | Matsuura et al. |
| 2009/0133006 | A1 | 5/2009 | Cheung |
| 2009/0216581 | A1 | 8/2009 | Carrier et al. |
| 2011/0099549 | A1 | 4/2011 | Sriraghavan et al. |
| 2011/0296372 | A1 | 12/2011 | Bird et al. |
| 2012/0210298 | A1 | 8/2012 | Hodgins et al. |
| 2013/0007704 | A1* | 1/2013 | Haynes ................. G06Q 10/00 717/120 |
| 2013/0111428 | A1 | 5/2013 | Begel et al. |
| 2013/0124268 | A1 | 5/2013 | Hatton et al. |
| 2014/0047413 | A1 | 2/2014 | Sheive et al. |
| 2014/0068545 | A1 | 3/2014 | Lehmann et al. |
| 2014/0173561 | A1 | 6/2014 | Toub |
| 2014/0282097 | A1 | 9/2014 | Edlund et al. |
| 2014/0325336 | A1* | 10/2014 | Odenheimer .......... G06Q 50/01 715/234 |
| 2015/0040101 | A1 | 2/2015 | Rummler et al. |
| 2015/0160931 | A1 | 6/2015 | Glazer et al. |
| 2015/0301806 | A1 | 10/2015 | Leon et al. |
| 2016/0004529 | A1 | 1/2016 | Xia et al. |
| 2016/0048486 | A1 | 2/2016 | Lopategui |
| 2016/0063840 | A1 | 3/2016 | Kumarasamy Mani et al. |
| 2016/0070547 | A1 | 3/2016 | Ramanathan |
| 2016/0179479 | A1 | 6/2016 | Bates et al. |
| 2016/0179508 | A1 | 6/2016 | Bates et al. |
| 2016/0224337 | A1 | 8/2016 | Xia et al. |
| 2016/0371079 | A1 | 12/2016 | Balasubramanian et al. |
| 2017/0090704 | A1 | 3/2017 | Hu et al. |
| 2017/0109179 | A1* | 4/2017 | Hughes .................... G06F 8/70 |
| 2017/0289210 | A1 | 10/2017 | Pai et al. |
| 2017/0357486 | A1 | 12/2017 | DeLuca et al. |
| 2018/0012181 | A1 | 1/2018 | Blincoe et al. |
| 2018/0046455 | A1 | 2/2018 | Walsh et al. |
| 2018/0285103 | A1* | 10/2018 | Jha ............................ G06F 8/10 |
| 2019/0004925 | A1* | 1/2019 | Buckingham ........ G06Q 10/101 |
| 2019/0213101 | A1 | 7/2019 | Raviv et al. |
| 2019/0272171 | A1 | 9/2019 | Chen et al. |
| 2019/0303140 | A1* | 10/2019 | Kelly ............. G06Q 10/063112 |
| 2021/0209561 | A1* | 7/2021 | Kishore ............ G06Q 10/1095 |

OTHER PUBLICATIONS

Jim Whitehead, Collaboration in Software Engineering: A Roadmap, 2007 IEEE, [Retrieved on Sep. 22, 2022]. Retrieved from the internet: <URL: https://ieeexplore.ieee.org/stamp/stamp.jsp?tp=&arnumber=4221622> 12 Pages (1-12) (Year: 2007).*

International Search Report & Written Opinion for International Application No. PCT/US2018/047404, dated Nov. 21, 2018; 19 pages.

International Search Report & Written Opinion for International Application No. PCT/US2018/046558 dated Aug. 22, 2018; 11 pages.

Susanne Hupfer et al., Introducing Collaboration into an Application Development Environment, 2012, [Retrieved on Jul. 1, 2020]. Retrieved from the internet: <URL: https://dl.acm.org/doi/pdf/10.1145/1031607.1031611> 4 Pages (21-24) (Year: 2004).

Christof Ebert et al., Collaboration Tools for Global Software Engineering, IEEE 2010, [Retrieved on Jul. 1, 2020]. Retrieved from the internet: <URL: https://ieeexplore.ieee.org/stamp/stamp.jsp?tp=&arnumber=5420797> 4 Pages (52-55) (Year: 2010).

International Search Report and Written Opinion in PCT International Application No. PCT/US2022/011188, dated Mar. 30, 2022.

* cited by examiner

FIG. 1E

ALL CHANGED FILES ⌄  ↓ ↑

All Changed Files         s. json -1 js +1 -1

Initial Review            her/helles.js +1 her/lager.js +1 -1
213
Update #1                 ty/beer.js +2-2

Update #2                 ty/stout.js +2-1

Update #3 onboarding .less          -251 deleted

Blame map  reassign code responsibility

Code Authored By           Now Handled By dave@acme.com                  tracy ⌄

Add mapping

Projects / CodeStream / COD-853

Re-implement as a functional component ←—506

Attach | Create subtask | Link issue ⌄

Description

...we're moving from classes to functions.

[codestream] shared/ui/Stream/RoadBlock.tsx (Lines 10-14)

```
1  export default class RoadBlock extends React.Component<Props, State> {
2      static defaultProps = {
3          title: ""
4      };
```

Open in IDE

Activity

Show: Comments | History | Work log

 Add a comment...

Pro tip: press [M] to comment

| Tasks | 📥 📄 ⎇ 🔍 👥 ⋯ |

Open Reviews ←——601

👤 Line breaks displayed in Change Requests section  R...  23 hrs ago
👤 Webview refactor  Fix this hot mess  23 hrs ago
👤 Feature: Bitbucket auth  I've got this stubbed out a bit...  1 day ago
👤 Feature: foo-first cut  I've got this stubbed out s bit. C...  1 day ago Work in Progress
📓 hello-bronx ⑂ feature/foo                    [@ Request Review]

MODIFIED FILES (VS. 66219ac4)

agent.js +1
   extension.js +1 -1
   webview.js +6

4c49f157
   LOCAL COMMITS
    ◇ Another refractor

What are you working on?  @  [+Ad-Hoc Work]  [+New Card]
Show cards assigned to you  from Trello
📘 Another horrible bug!                         HIGH PRIORITY
📘 Can't edit issue assignees  After creating an issu...  Medium Priority
📘 BUG: highlighting left behind when you switch views...  Medium Priority
📘 Really awful bug!  This is a really bad bug in prod...  HIGH PRIORITY > CodeStream Howto new!                              (+)

📘 Line breaks displayed in Change Requests section
Strip them out when displayed in this section?
Truncate at a line break?
📓 hello-ny ⑂ feature/foo                                    ←——602
☑ Create branch feature/ticket- Iwka3EAr ˅
☑ Move this card to In Progress ˅

[Cancel]  [Create Branch & Start Work]

FIG. 6B

SYSTEM AND METHOD FOR IN-IDE CODE REVIEW

CROSS-REFERENCE TO RELATED APPLICATIONS

This application is a continuation-in-part of U.S. Non-Provisional application Ser. No. 16/996,867, filed 18 Aug. 2020, which is a continuation of U.S. application Ser. No. 16/312,785, filed on Dec. 21, 2018, now U.S. Pat. No. 10,782,937 which is a 35 U.S.C. § 371 national stage application of PCT International Application No. PCT/US18/47404, filed on Aug. 22, 2018, which claims the benefit of U.S. Provisional Application No. 62/659,346, filed on Apr. 18, 2018, U.S. Provisional Application No. 62/626,575, filed on Feb. 5, 2018, and U.S. Provisional Application No. 62/548,776, filed on Aug. 22, 2017, all of which are hereby incorporated herein.

BACKGROUND

Conventional systems for software development incorporate many enhancements to facilitate the development of code, updates, and code modifications. A variety of integrated development environments ("IDE") exist to provide the necessary architecture to organize code development tasks, such as compiling, debugging, and code formatting tools. Unfortunately, coordination of work remains a significant challenge. The need for merging and reconciliation of code changes between the individual developers on a software development team remains a significant stumbling block, causing inconsistencies and internal conflict within developed code.

Documentation of code has been a source of frustration and conflict in software development for many years. The problem is, fundamentally, that many developers do not document their code, or do so poorly. As a result, other developers who need to understand the code they are utilizing or changing spend many frustrating hours addressing this shortcoming. Understanding code can take as much as 10× the amount of time as writing new code.

Code does not get documented mainly because of the amount of time documentation requires. During a push to release a new feature, time constraints make it even more difficult and costly to document new and updated code. When code does get documented, the documentation often falls out of date as the software is updated over time.

SUMMARY

The systems and methods described herein provide for the augmentation of an integrated development environment (IDE). In one embodiment, the IDE may be executed by at least one processor. The IDE may include a development module configured to manage access to a code repository and version control application. The development module may comprise a tracking module, task related objects module, code review module, live view module, activity feed module and an interface module.

In some embodiments, the interface module may be configured to generate a task management panel in conjunction with a code editing panel. The task management panel may be configured to display task related actions selectable by a first user. The interface module may receive a selection of a first task related action from the first user. The task related action may then be generated or retrieved and updated with information relating to one or more interaction of the first user with one or more code files, one or more lines of code, and comments associated with the task.

In some embodiments, a code review module may be configured to receive a request from the first user to initiate a code review associated with the first task related object. The code review itself may comprise the packaging of one or more code files, one or more lines of code, one or more difference sets, comments, and one or more user selected additional code files or lines of code. The user may select one or more reviewers to assign the code review to. The one or more reviewers may be notified that a review is pending or due. The notification may be displayed to the user as a notification within the IDE, allowing the user to select or click the notification to be directed to the code review within the IDE. The interface displayed to the code reviewer may be the same or different from the interface displayed to the user that submitted the code review or other users and colleagues that have access to view the code reviews but are not assigned as a reviewer. The initiation of the code review, the notification of the pending review, displaying of information related to the task related object, the reviewing of the code and subsequent approval, the creation of a pull request (PR) and the merging of the PR in a continuous integration continuous deployment (CICD) pipeline is performed from within, and without leaving the IDE.

In some embodiments, a live view module may be configured to generate a list of users, including the first user and one or more second users. The list of users along with one or more task related objects associated with each of the users in the list may be displayed. Upon selection of a user from the list of users, one or more first information items relating to that user may be displayed. Upon selection of a task related object associated with a user of the list of users, one or more second information items relating to the task related object may be displayed. The displayed first and second information items may also be selectable and upon selecting a displayed information item, the user may be redirected to a code file, line of code, or comments associated with the selected information item.

The one or more task related objects may comprise a description of a task associated with the task related object, one or more code files that have been modified or require modification, a record of user based modification, addition or deletion of one or more lines of code from the one or more code files and comments associated with the task, one or more code files or modifications to lines of code.

In some embodiments, the tracking module may be configured to store a list of one or more task related objects, wherein the one or more task related objects are associated with the first user and one or more second users. The tracking module may update the one or more task related objects, in real-time, based on the interaction of the first user or one or more second users with the one or more task related objects.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 1E shows an example interface of a code review process in accordance with aspects of the present disclosure.

FIG. 2D shows an example interface of a code review update process in accordance with aspects of the present disclosure.

FIG. 2E shows an example interface of a code review update process in accordance with aspects of the present disclosure.

FIG. 3 shows an example interface of a live view of user interactions in accordance with aspects of the present disclosure.

FIG. 5F shows an example interface and process of integrating an issue tracker within an IDE in accordance with aspects of the present disclosure.

FIG. 6A shows an example task and workflow management interface in accordance with aspects of the present disclosure.

FIG. 6B shows an example task and workflow management interface in accordance with aspects of the present disclosure.

DETAILED DESCRIPTION

Figure 1A:
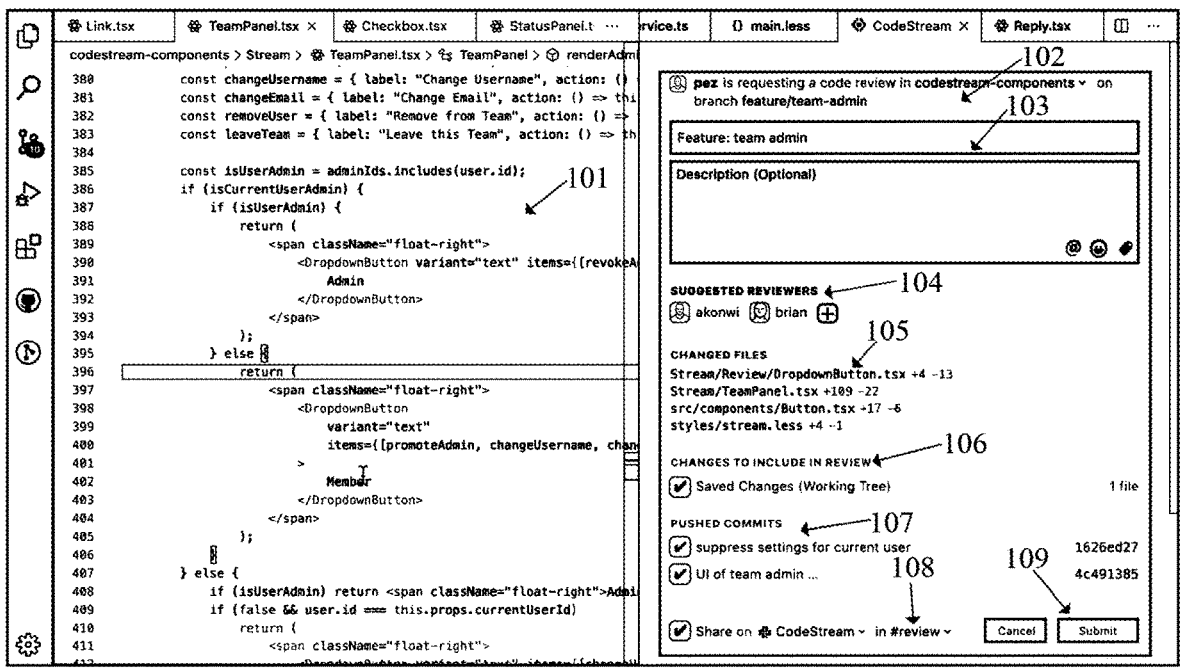
FIG. 1A shows an example interface of a code review process in accordance with aspects of the present disclosure.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system and methods for IN-IDE code review. A user may request a code review from within the IDE and one or more reviewers may perform the review from within their IDE, without the need to ever leave the IDE. The system and methods may also be used to bring the entire development process and all a user's development tools into the IDE, and eliminating the need for the user to open other applications or websites. From within the IDE the user may grab a ticket, create a branch, modify the code files related to the issue/feature being addressed by the ticket, request feedback on sets of changes, initiate a code review, and create and merge a PR. The IDE may also provide full source-tree and full file access, keybindings, jump-to-definition, and embedded code intelligence.

The system may integrate all of a team's development tools directly into the IDE. The system allows users to ask and reply to questions through communication channels or messaging services and update tickets in issue tracking systems without ever having to change windows or switch context.

The system may also incorporate one or more plugins or extensions to a web browser, wherein the plugin is configured to allow a user to navigate to and/or open pull requests in the IDE when viewing a pull request from an issue tracker system's, or version control system's webpage. The plugin/extension may provide an option to automatically check you out to the PR's branch when opening the PR. The plugin/extension may also add a "Start Work" button to the top-right of any issue page on an issue tracking system or version control system. The button may not be limited to a traditional button and may be a text link or other selection input. Clicking on the "Start Work" button will open the issue in the IDE, where the user may create a feature branch to perform their work and update their status on one or more communications channels, activity feeds, or real-time live view panels within the IDE, to let other users or teammates know what the user is currently working on.

Figure 1B:
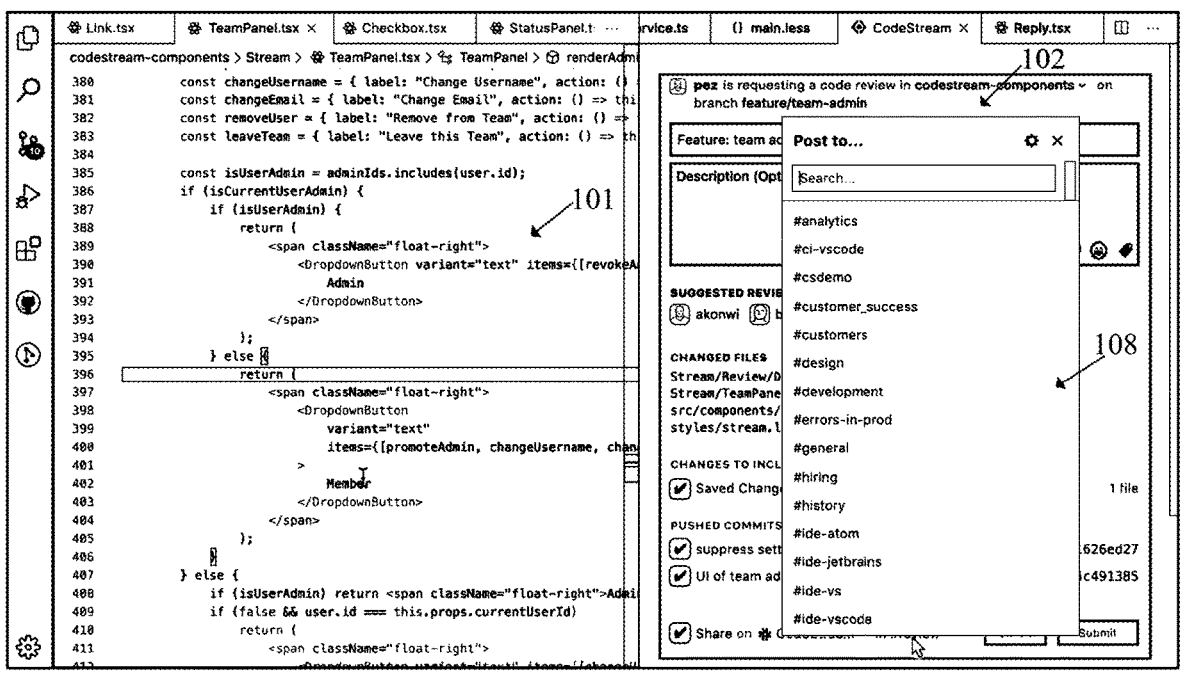
FIG. 1B shows an example interface of a code review process in accordance with aspects of the present disclosure.

FIGS. 1A-1B show an example code review interface 100 and process in accordance with aspects of the present disclosure. The code review interface 100 may comprise an editing panel 101 and a code review panel 102.

Within the code review interface 100, the user may be displayed a panel comprising open reviews, work in progress (WIP) and tickets/cards or other assignments assigned to the user and pulled from an issue tracking system (ITS). The WIP may display all modified files that a user has been working on for the ticket being worked on. The user may initiate a code review by selecting a request review button associated with the ticket and all of the logged/tracked changes, modification and additions to the files related to the ticket. The selection of the request review button automatically packages all or some of the changes performed by the user for inclusion in the code review being created/requested. Notably, these changes do not need to be committed to the version control system in order to be shared and reviewed with other users.

Upon selecting the request review button, the user may be displayed with a code review panel 102. The code review panel 102 may comprise a code review description 103, one or more reviewers 104, one or more changed files 105, one or more included changes 106, one or more pushed commits 107, a share menu 108 and a submit button 109. The system may also automatically track all changes, modifications, comments or user interactions within the development environment and external systems/tools integrated into the IDE. The code review description 103 may be automatically generated based on a predetermined naming convention, based on the most recent commit, based on the branch name, or user created. The user may be provided with a list of suggested or recommended reviewers 104 to include and assign the code review to. The suggestion may be based on the organizational structure of the development team, original authors of the code, teams assigned to the modified code, developers working on similar features/issues/ticket or any combination thereof. The list of one or more reviewers 104 may also allow the user to add additional reviewers not currently displayed by searching for one or more reviewers. The searching may be performed by a text search, selection for another list of reviewers, or pulled from a communication channel, contact lists, employee lists and direct messages (DMs) from colleagues. The user may also select the approval requirements related to the code review, such as requiring all reviewers to approve the modifications to the code, or requiring any of the reviewers to approve.

The one or more changed files 105 may display all or some of the files modified by the user. The one or more included changes 106 may display all or some of the changes made to the code. The one or more pushed commits 107 may display all or some of the user's pushed commits. The user may select and include, in the code review, additional changes, code files, commits, comments and other data related to the ticket being worked. The user may also deselect and exclude, from the code review, changes, code files, commits, comments and other data related to the ticket being worked.

From the share menu 108, the user may choose one or more messaging apps or communication channels to share the code review with. As shown in FIG. 1B, the user may be provided with a list and search option to choose from.

The system may automatically package up all of the selected changed files 105, included changes 106, pushed commits on the user's current branch and include them in a code review object. The code review may be performed without the code being committed and pushed. This allows developers to get feedback earlier in the development process. Code review may be initiated on both finished and WIP features/issues/tickets. Upon selecting the submit button 109, the code review package is submitted for review. The submission of the code review may trigger notifications to be sent to the selected reviewers or any additionally selected or automatically selected users, reviews or colleagues. The notifications may be sent through email, communication channels, instant messenger services, direct messages, toast notification, desktop and phone notification, push notification or combination thereof.

The way in which assignments or suggestions of reviewers for a code review may also be selected by the user or one or more reviewers. An administrator may also change code review settings to adjust the suggested reviewers for code reviews. The administrator may determine if and how suggested reviewers are assigned when a code review is requested. The suggestions may be made by round-robin, random assignment, authorship, or other rules-based criteria. The selection of authorship may suggest one or more reviewers based on the authorship of the lines of code impacted by the changes, as well as other developers who may have committed to the branch.

Figure 1C:
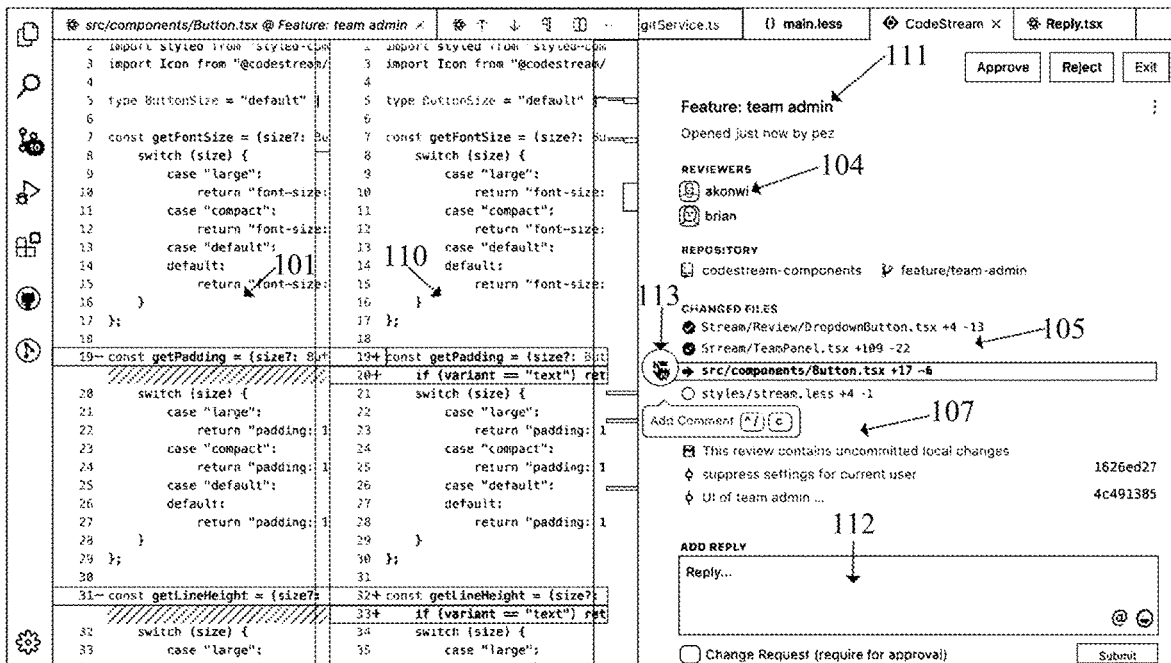
FIG. 1C shows an example interface of a code review process in accordance with aspects of the present disclosure.

FIG. 1C shows an example code review interface 100 in accordance with aspects of the present disclosure. The code review interface 100 may comprise updated code panel 110, reviewer panel 111 and reviewer reply 112. The reviewer panel may further comprise information relating to the reviewers 104, the changed files 105, commit information 107, reviewer reply 112 and one or more reviewer comment buttons 113.

The reviewer reply 112 may allow the reviewer to add and submit replies and comments regarding the submitted code review. The one or more reviewer comment buttons 113 may be selected by the reviewer to comment on the one or more changed files 105, one or more included changes 106, one or more pushed commits 107 or to enter a comment or feedback on a code file or lines of code that were not included in the packaged code review. The reviewer may also select any of the changed files 105, included changes 106 or pushed commits 107 to view the changes in the updated code panel 110. The change between the editing panel 101 and the updated code panel 110 may be indicated by highlighting of the added, edited or removed code in either of the panels.

Visually indicating changes may be accomplished in a number of ways and may be used in combination to convey the changes made to the code currently being reviewed.

Figure 1D:
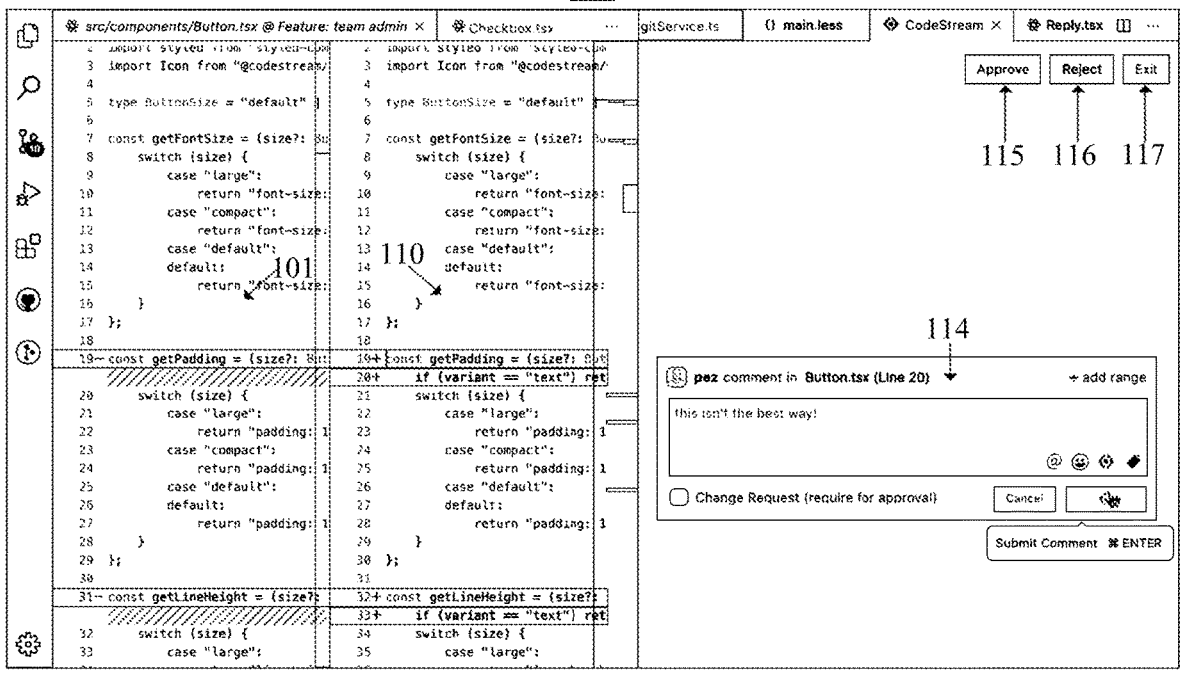
FIG. 1D shows an example interface of a code review process in accordance with aspects of the present disclosure.

Upon selection of the reviewer comment button 113 the reviewer may be provided a text input field, allowing the reviewer to provide feedback on each individual change. As shown in FIG. 1D, a reviewer comment box 114 is displayed to allow the reviewer to enter a comment relating to the selected change. Upon submission, the reviewer comment will be included in the code review package and associated with the code the reviewer had selected. This association of comments, replies and feedback allows for any reviewer or user with appropriate authorization to view the comments for each individual change. This allows for an understanding of the development path and thought process used in the solving of an issue or feature implementation. The comments associated with each changed file may be displayed based on time/date of the entered comment, the reviewer/user who entered the comment, or organized and filtered based on a user created query or selection.

Figure 1E:
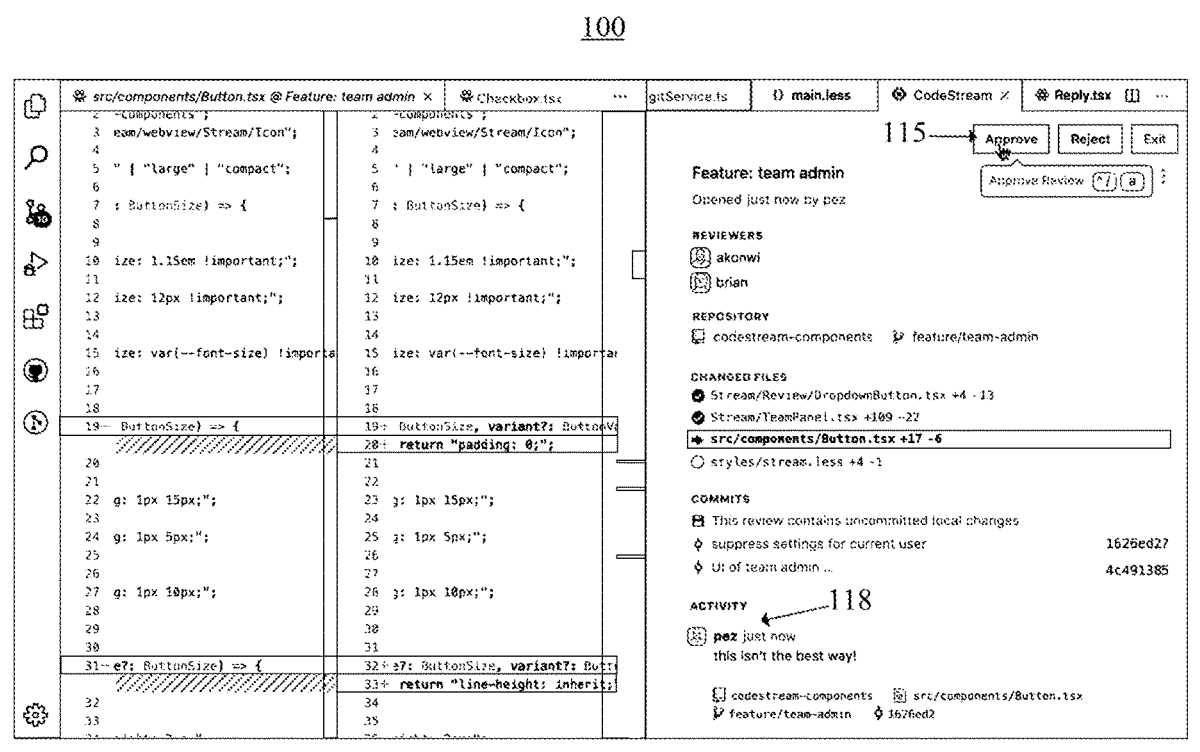

The reviewer may also include a change request associated with the entered comment and/or with one or more code files or lines of code. The change request and comments need not be limited to the files in the list of changed files 105 and may be associated with unchanged files and unchanged lines of code. Upon submitting the comment and/or change request, the reviewer may be returned to a reviewer panel 111 with an updated review activity 118, as shown in FIG. 1E. The review activity 118 may display a list of all comments and communications between reviewers and the user during the code review process. The reviewer may then select the approve button 115 to approve the code review.

Each code review may require one or more assigned reviewers to review the submitted code review. Furthermore, the code review may require the one or more assigned reviewers to approve the code review or, alternatively, all of the assigned reviewers to approve the code review. In some embodiments, reviewing and approving code reviews may be performed by any user of the system. In some embodiments, any user with seniority or superiority to the user submitting the code review may review and approve the code review.

Figure 2A:
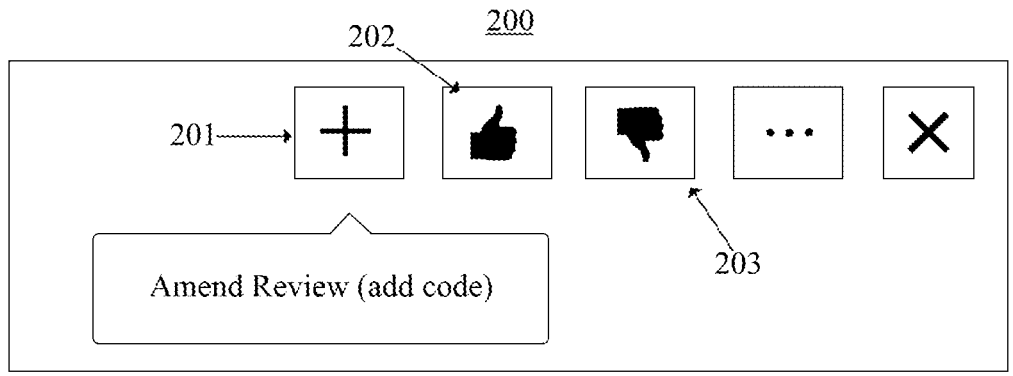
FIG. 2A shows an example interface of a code review update process in accordance with aspects of the present disclosure.
Figure 2B:
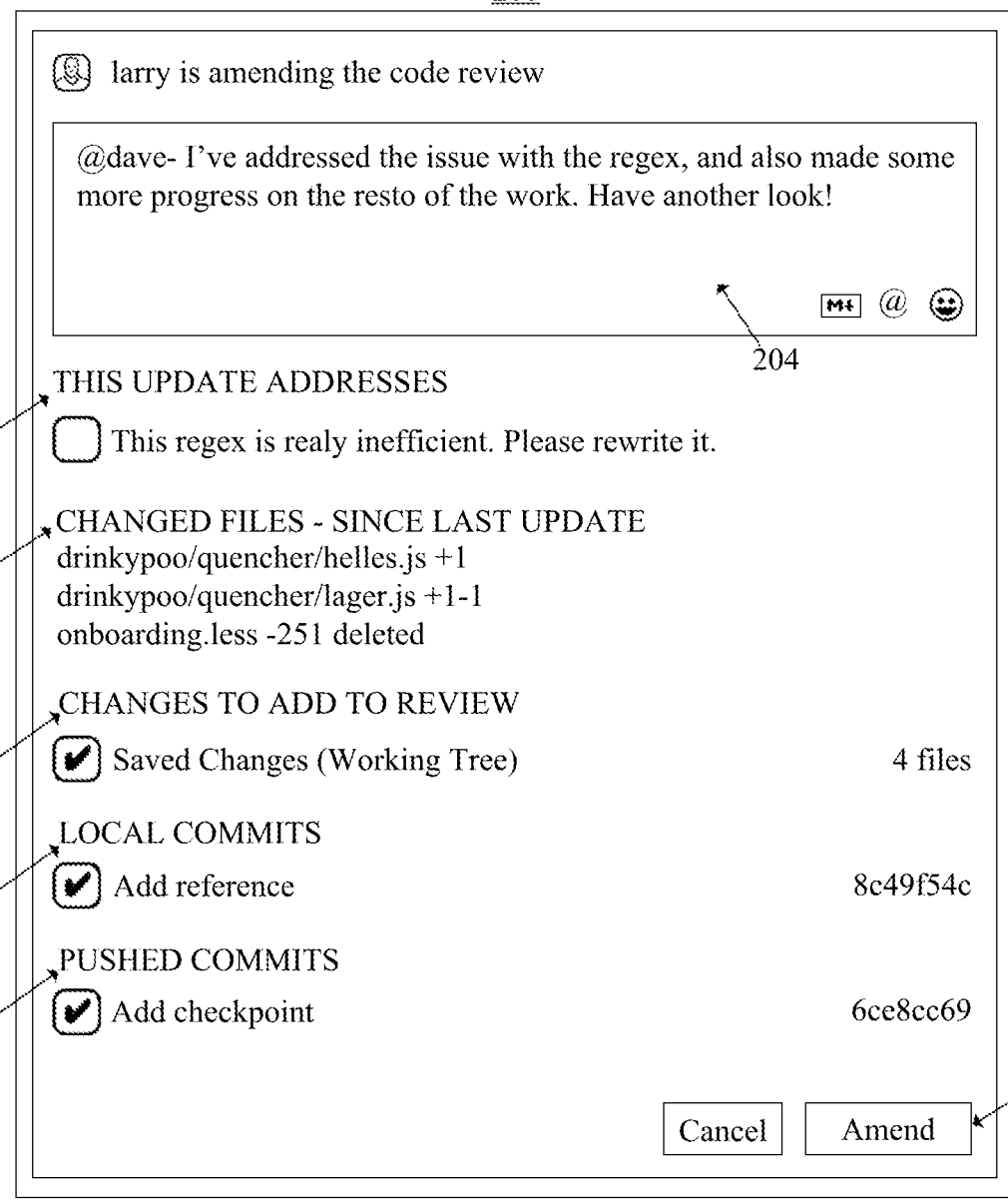
FIG. 2B shows an example interface of a code review update process in accordance with aspects of the present disclosure.

FIGS. 2A-2B show an example interface of a code review update process in accordance with aspects of the present disclosure. The code review update process may comprise an amend review button 201, like button 202, dislike button 203, amend comment box 204, update description 205, changed files since last update 206, added changes 207, local commits 208, pushed commits 209, amend confirmation button 210, update commit history 211, review activity history 212, update selection menu 213 and a blame map 214.

The amend review button 201, may be selected from any existing code review. A user or reviewer may also provide feedback on the code review by selecting the like button 202 or dislike button 203. Upon selection of the amend review button 201, a panel may be displayed to the user, comprising the amend comment box 204, update description 205, changed files since last update 206, added changes 207, local commits 208, pushed commits 209 and amend confirmation button 210. The amend comment box 204 may allow the user to add a message to provide additional commentary to an automatically generated reply letting the reviewers know that there has been an update to the code review. The user may also mark any change request as completed if they are addressed by the changes being added. The user may also select pushed commits, local commits, staged changes and saved changes to include in the update, just like when requesting the initial code review.

Figure 2C:
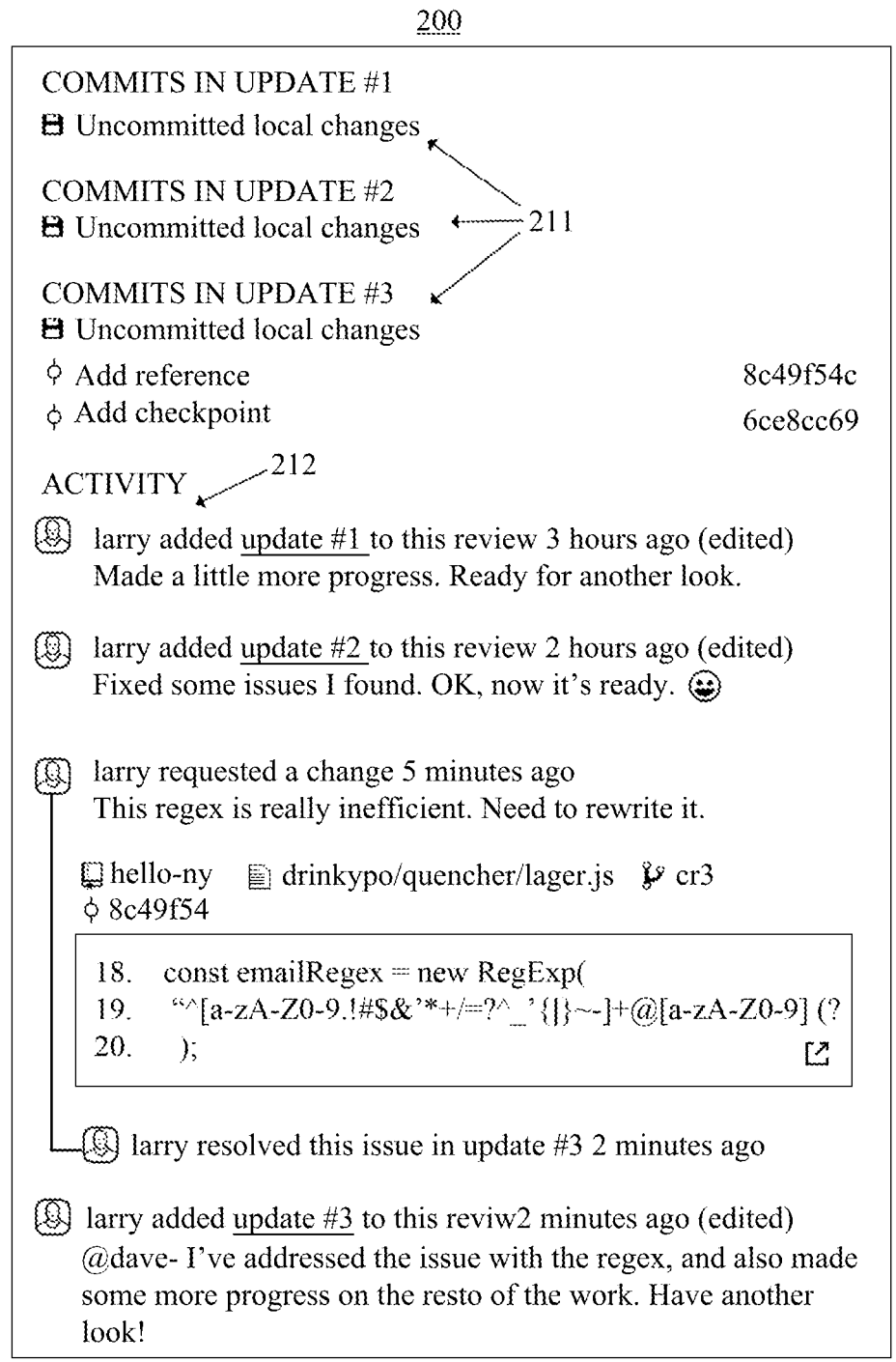
FIG. 2C shows an example interface of a code review update process in accordance with aspects of the present disclosure.

FIG. 2C shows an example code review discussion thread in accordance with aspects of the present disclosure. The update commit history 211 displays one or more updates to the code review. The user and/or reviewers may select an update from the update commit history 211 in order to view additional information related to the selected update as well as details of what was included in the update. The review activity history 212 may display user or reviewer interactions with the code review and the included files and changes. The displayed activity may be selectable to expand on the level of detail currently being displayed. The development process may be simplified and streamlined by allowing the iteration of changes and feedback within a single review. The iteration of a single review may be easier to follow and understand than a string of separate reviews for the same or similar features or issues.

FIG. 2D shows an example code review change set selection in accordance with aspects of the present disclosure. When a reviewer opens a review, the complete change set may be displayed. The reviewer may then select, from the update selection menu 213, a specific update to view the change set from.

FIG. 2E shows an example implementation of a blame map in accordance with aspects of the present disclosure. Comments related to code files, lines of code and/or code reviews may cause a notification to be sent to the author(s) of the code. If an author of the code is no longer responsible for the code that they have produced, as a result of changing positions or leaving the company, the responsibility for the code may need to be reassigned. Blame map 214 may allow the reassignment of responsibilities some or all code produced by the original author, to a different user or team member. After the assignment to the new user/team member, when a user asks a question about that code, or requests a review of changes to that code, the new user/team member will be mentioned/assigned instead of the original author.

Figure 3:
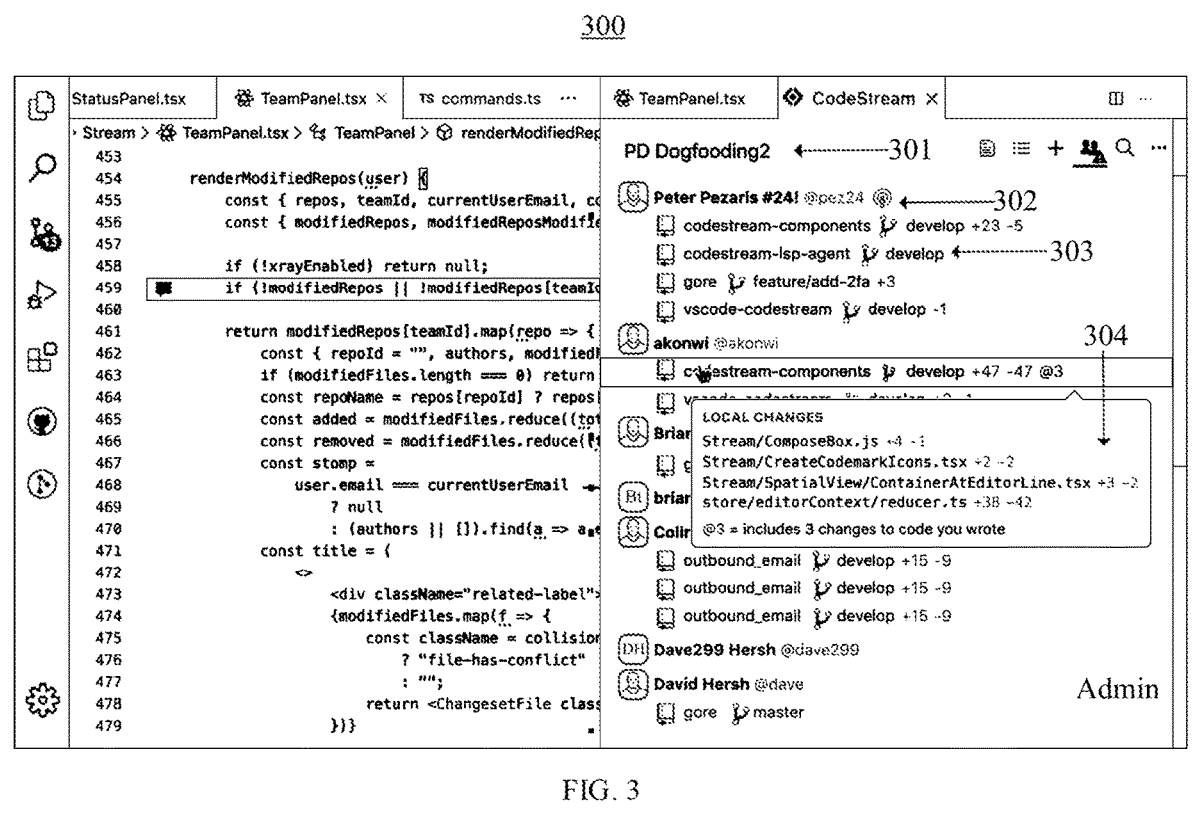

FIG. 3 shows an example of a live view interface 300 of user interactions in accordance with aspects of the present disclosure. The live view interface 300 may comprise live view panel 301, user list 302, user current activity list 303 and user activity information 304.

The live view panel 301 allows a user to see a live snapshot of what everyone on the team or inside the organization is working on. The user list 302 may display one or more users of the IDE. For each user, a user activity list 303 is displayed. The user activity list 303 may show current code files being modified, a list of the repositories in which they have made local changes, including edits that have not been pushed. Each activity of the user activity list 303 may be selectable, and upon a selection or hovering of a cursor over the activity, user activity information 304 may be displayed. User activity information 304 may comprise a list of files that have changed, and the line number additions and deletions.

Within the live view interface 300, merge conflict alerts may be displayed for files that multiple users are making changes in. The identification of a merge conflict and the subsequent alerting of the one or more users involved in the merge conflict may be performed in the live view interface 300 or other tracking or version control system. The merge conflict identification and alert may be performed on edits and changes to code even on another branch or uncommitted code to help avoid a merge conflict.

FIGS. 4A-4F show an example interface of a task initiation and workflow process in accordance with aspects of the present disclosure. The task initiation and workflow process 400 may comprise a ticket selection menu 401, ticket filter settings 402, list of open tickets 403, branch creation button 404, updated user activity 405, pull request 406 and code review summary 407. When a user starts a new project, they may create a feature branch for their work and update the status of their work on an ITS and/or on a live view interface or other real-time status tracking within the IDE. The ticket selection menu 401 may allow a user to search and filter available tickets/issues/change or feature requests. The user may perform a text based search for a ticket to pull, or may select from a list of available tickets. The user may adjust the way in which tickets are displayed through a ticket filter settings 402 button.

The user may select a card or ticket from the list of open tickets 403. Upon selecting a ticket, information relating to the ticket may be displayed to the user. The user may be able to select additional actions to be taken when creating a branch for the ticket. The user may then select the branch creation button 404, resulting in the creation of a feature branch and automatically naming the branch based on the title or description of the ticket. A naming convention may be set for all branches created from tickets. For example, a development team may set up a pattern for naming the branches based on tokens such as username, team name, card ID and date.

After the pulling of a ticket and the creation of a branch, the ITS is updated with the status of the ticket and the activity of the user is updated in the updated user activity 405 section. The user may commence with their development tasks and continue working on the pulled ticket in the created branch. The user may request code reviews on uncommitted WIP code during this time.

Figure 4A:
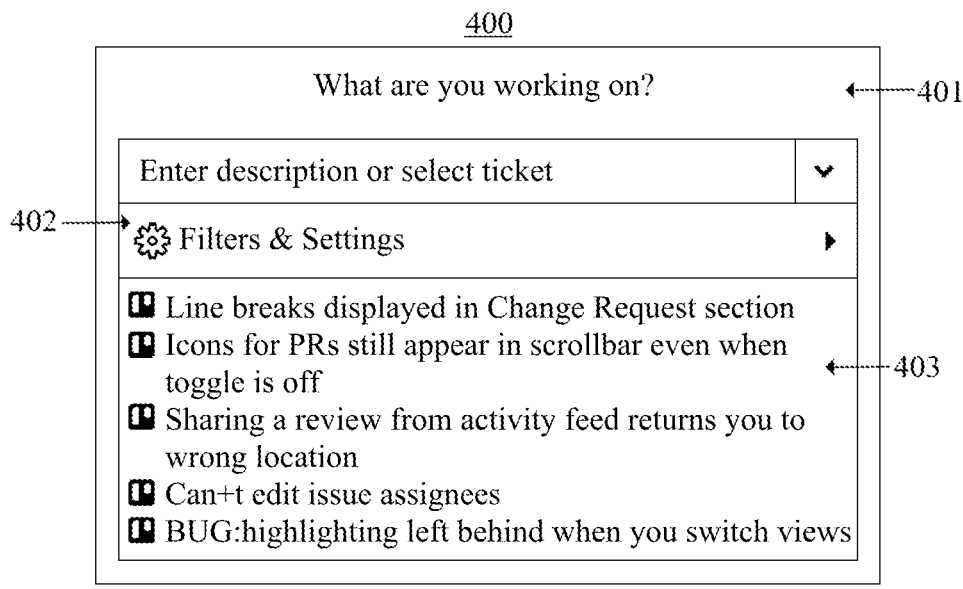
FIG. 4A shows an example interface of a task initiation and workflow process in accordance with aspects of the present disclosure.
Figure 4B:
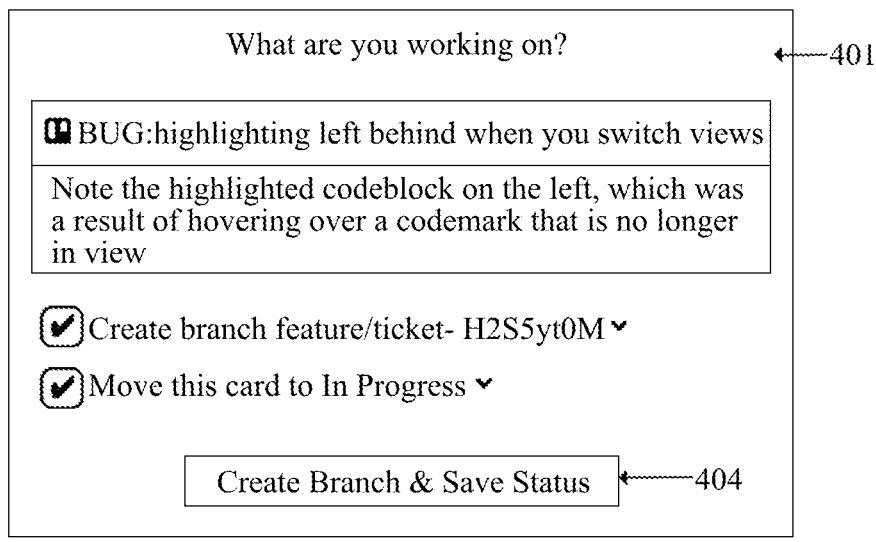
FIG. 4B shows an example interface of a task initiation and workflow process in accordance with aspects of the present disclosure.
Figure 4C:
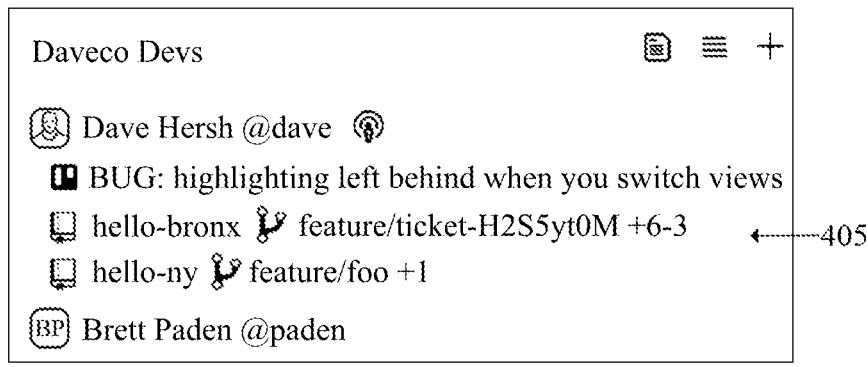
FIG. 4C shows an example interface of a task initiation and workflow process in accordance with aspects of the present disclosure.
Figure 4D:
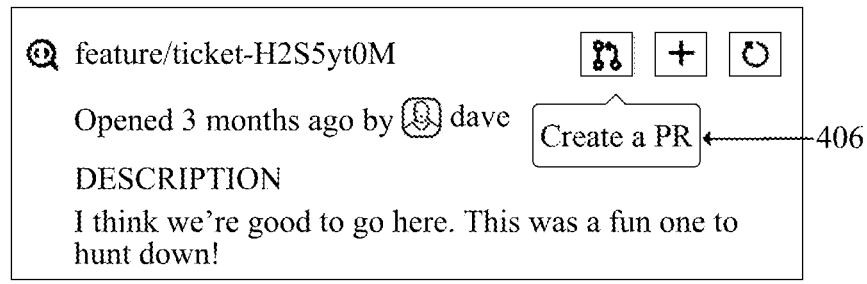
FIG. 4D shows an example interface of a task initiation and workflow process in accordance with aspects of the present disclosure.
Figure 4E:
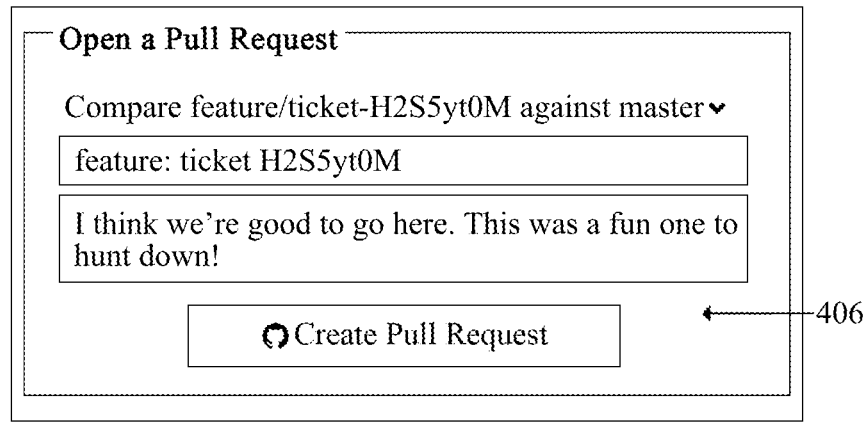
FIG. 4E shows an example interface of a task initiation and workflow process in accordance with aspects of the present disclosure.

Once a code review is approved for the work completed on the ticket, the user may create a pull request. The user may select a button to create a pull request as is shown in FIG. 4D. Upon selected, information relating to the pull request may be displayed to the user along with a create pull request button as shown in FIG. 4E.

Figure 4F:
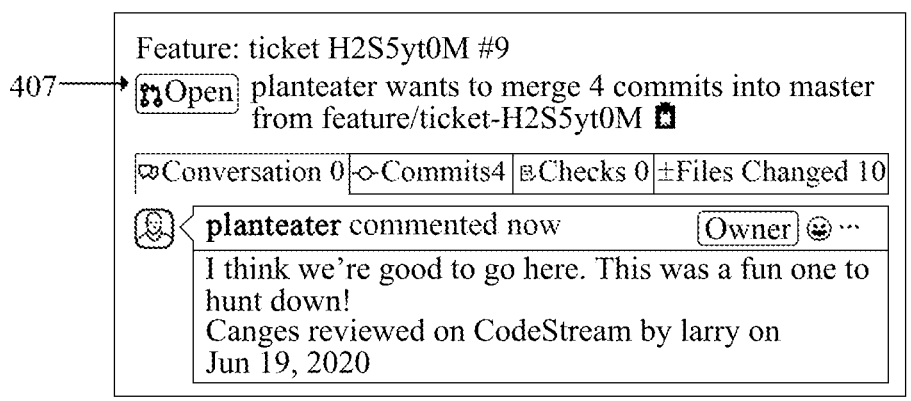
FIG. 4F shows an example interface of a task initiation and workflow process in accordance with aspects of the present disclosure.

After the selection of the create pull request button, the pull request is created and further includes summary information regarding the code review associated with the ticket and pull request. FIG. 4F shows a code review summary 407 displayed to the user. A permanent link (permalink) may be created and included along with the summary information. The permalink may be shared with others through communication channels, instant messaging services, direct messages or email. The permalink may be shared inside or outside of the organization. When a user or any other entity that has received a permalink selects/clicks the permalink, they will be directed to the ticket or summary information related to the code review. The permalink may be embedded in external documentation, communications between users or as a notification. The review summary information can therefore always be reached by anyone with authorization. The link may never change, and always point to a specific code review summary. This produces an audit trail to preserve a log of all work performed.

FIGS. 5A-5F show an example interface for a bidirectional integrated issue tracker 500 within an IDE in accordance with aspects of the present disclosure. The bidirectional integrated issue tracker 500 may comprise an in-IDE issue ticket creation panel 501. The in-IDE issue ticket creation panel 501 may allow a user to grab a ticket, advance its status, create a branch and update a live view of the user's status and WIP. This streamlined process reduces the amount of user interaction needed. A user assigned tasks panel 502 may be used in the streamlining of a user's development workflow and results in a reduction of context switches. All tickets assigned to the user from one or more issue tracking system may be displayed to the user in the user assigned tasks panel 502.

The user may choose to create a custom filter to filter the tickets listed in the user assigned tasks panel 502. When a user wishes to create a custom filter, they may select an option to create one or more custom filters. Upon selection, the user may be displayed a custom issue ticket filter panel 503. The filter may be created using JQL or other query language. The filter may also be created through selections made in a filter creation user interface.

Figure 5A:
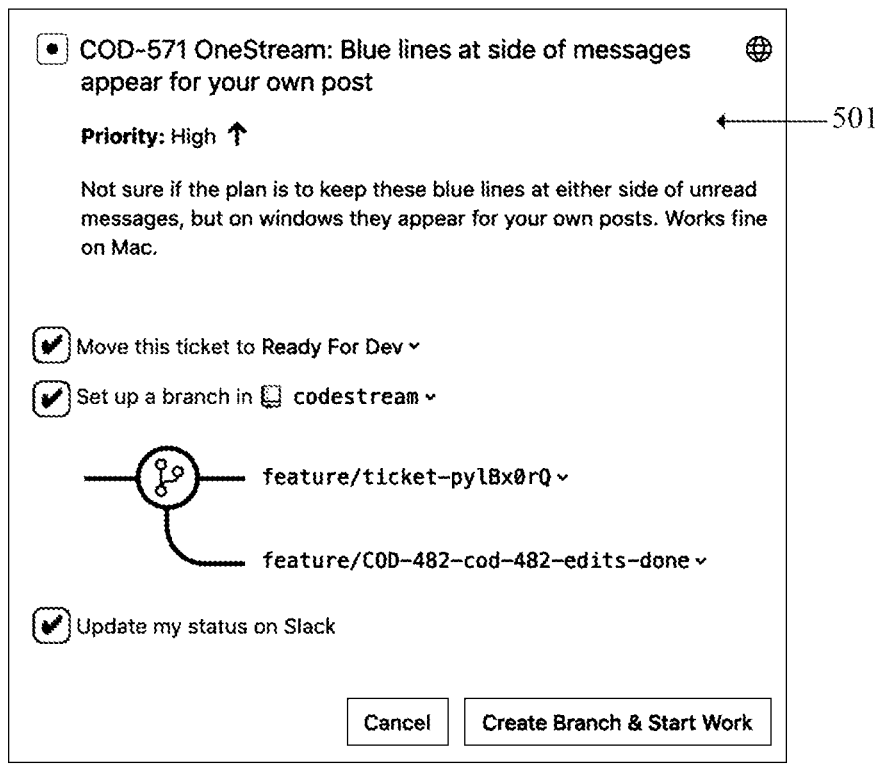
FIG. 5A shows an example interface and process of integrating an issue tracker within an IDE in accordance with aspects of the present disclosure.
Figure 5B:
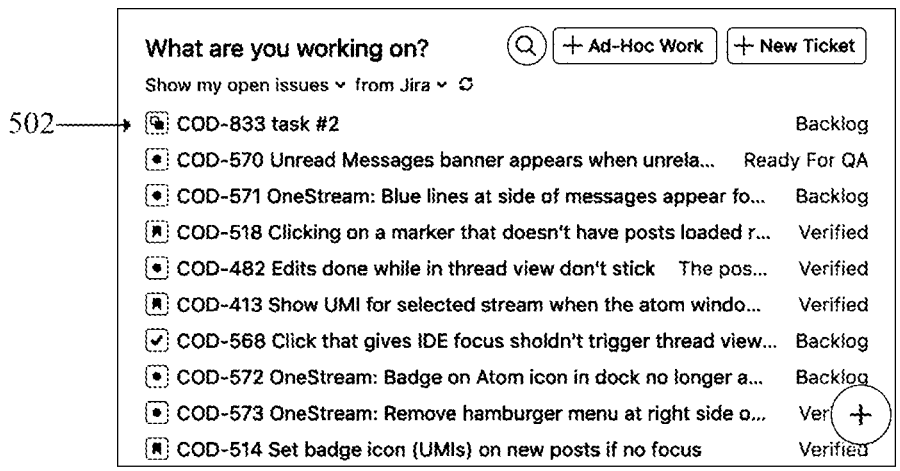
FIG. 5B shows an example interface and process of integrating an issue tracker within an IDE in accordance with aspects of the present disclosure.
Figure 5C:
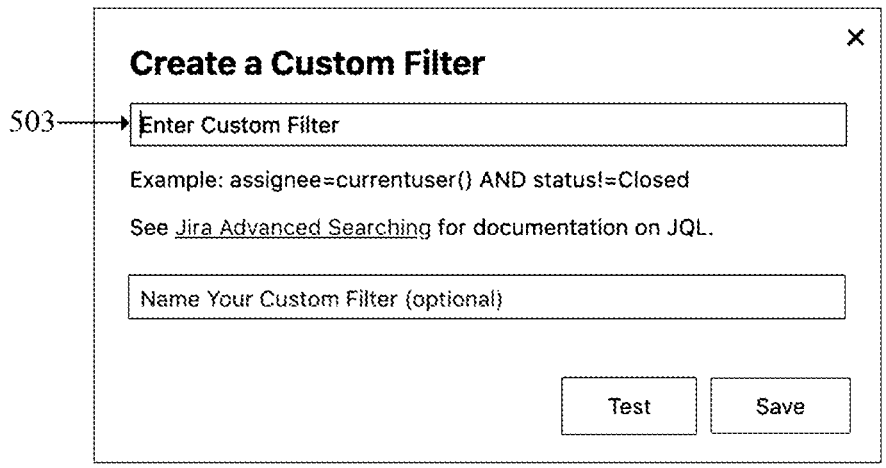
FIG. 5C shows an example interface and process of integrating an issue tracker within an IDE in accordance with aspects of the present disclosure.
Figure 5D:
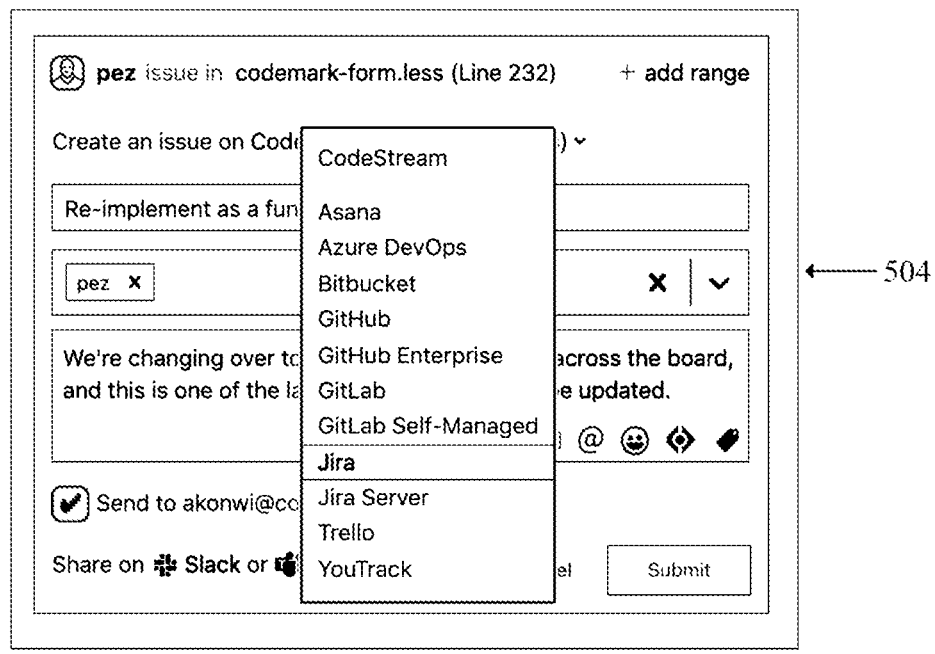
FIG. 5D shows an example interface and process of integrating an issue tracker within an IDE in accordance with aspects of the present disclosure.
Figure 5E:
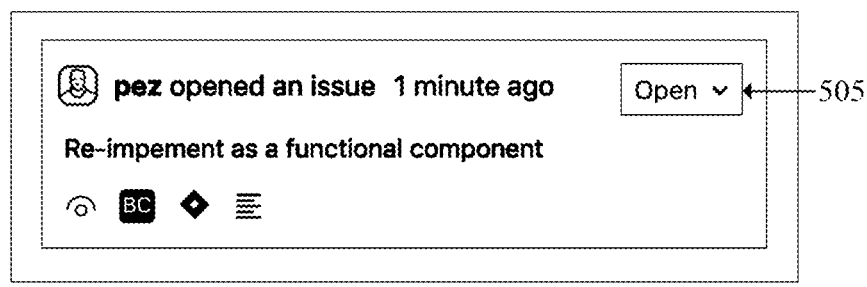
FIG. 5E shows an example interface and process of integrating an issue tracker within an IDE in accordance with aspects of the present disclosure.

The bidirectional integrated issue tracker 500 in the IDE may allow the user to create tickets in one or more issue trackers from within the IDE. When a user is commenting on code or performing a code review, the user may choose to create a new ticket and add that ticket to a user selected issue tracking system without leaving the IDE. The user may be displayed an in-comment issue ticket creation panel 504. The in-comment issue ticket creation panel 504 may be associated with the code or file currently being worked on and commented on by the user. The user may choose an issue tracking system, from a list of issue tracking systems, to create a ticket on. Additional information relating to the ticket may also be entered and/or selected from the in-comment issue ticket creation panel 504 before being created and submitted/added on the selected issue tracking system. Upon creation of the ticket from the in-comment issue ticket creation panel 504, the opened ticket may be displayed to the user as is shown in FIG. 5E. The user may click open button 505 to jump to an externally linked ticket 506, as shown in FIG. 5F, in the issue tracking system that the ticket was added to.

FIGS. 6A-6B show an example task and workflow management interface 600 in accordance with aspects of the present disclosure. The task and workflow management interface 600 may comprise a user workflow management panel 601.

The user workflow management panel 601 may display everything that a user is currently working on (WIP), has recently worked on, is assigned to the user, open reviews or other tickets, reviews, edit/modifications to code and other user interactions tracked within the IDE. An open code reviews section may be displayed prominently as addressing code review requests is a top priority. All open code reviews assigned to the user or reviewer may be listed at the top of the user workflow management panel 601. A work in progress section may provide the user or reviewer with a quick snapshot of what they are currently working on, including tickets/cards pulled from the ITS. Selecting or clicking on any filename within the work in progress section may trigger the IDE to display a diff of the current changes to the file. Under the work in progress section, an indication of potential merge conflicts may be displayed to the user. Hovering the cursor over the file in which the indication is associated with, or other selection of the file, may result in the display of all the users that are currently or have made modifications to the file. The user may choose to contact the one or more users/teammates to coordinate the work being performed on the file to avoid conflicts. The user may be allowed to select the one or more other users which are working on or modifying the file, individually or as a group, to direct a message to or otherwise communicate or coordinate with the one or more other users. The user may enter a custom message to be sent or an automatically generated message may be sent. Alternatively, an automatic message may be generated and sent to all users that may have merge conflicts with a file. Within the work in progress section, the user may also select a request review button to initiate a code review for the associated WIP ticket/card being worked on. There may be request review buttons next to each WIP entry in the list of issues/cards being worked. Alternatively, a single request review button may be displayed and upon selection, the user may be prompted to select the issue/card or files to initiate a code review on. The request review button may also be represented by an icon or '+' or other visual indicator. The user may also initiate a code review by selecting a WIP item from the WIP list, or by making a selection from an information window that is displayed in response to a selection of a WIP item or hovering of a cursor over a WIP item in the list.

The user workflow management panel 601 may communicate with the ITS and retrieve a list of all issues/cards assigned to the user or the user's team. The user may choose to filter the list to display a specific board or list. The user may click on any item in the list to start work on the issue/card. Any item in the user workflow management panel may be selected by the user in order to start work on the item or modify an item already in progress. When a user selects an item from any of the lists, the user may be displayed a branch creation window 602 associated with the selected item. From the branch creation window 602 the user may create a feature branch and update the status of the ticket/card automatically.

The integration pulling ITS tickets, WIP lists and open reviews associated with a user within a user workflow management panel 601 allows for a user to assess their workload at a glance. Multiple issue trackers may be integrated into the user workflow management panel 601 and the IDE in general. This allows for issues/tasks/cards from all tracking systems used by the development team to be displayed to the user in a single place. This provides the user with the ability to grab tickets/tasks/cards to work, regardless of the issue tracking system the item came from. All interaction with the one or more issue tracking systems may therefore be performed from within the IDE without the need to leave the IDE or open additional applications. The IDE may also communicate with the one or more issue tracking systems to update the status of the tickets/tasks/cards as they are being worked on by the user.

Figure 7:
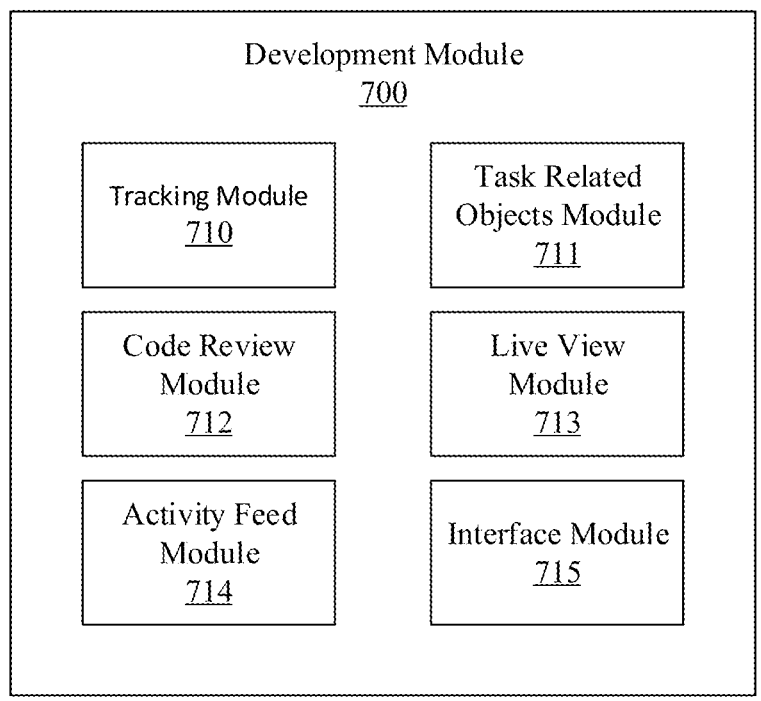
FIG. 7 shows an example of an integrated development environment system in accordance with aspects of the present disclosure.

FIG. 7 shows an example of an integrated development environment system in accordance with aspects of the present disclosure. The integrated development environment may comprise a development module 700, The development module 700 may further comprise a tracking module 710, interface module 715, task related objects module 711, live view module 713, activity feed module 714 and code review module 712.

Development Module 700 may manage access between the IDE and one or more code repositories, issue tracker systems, version control applications, databases or other development applications or systems.

Tracking Module 710 may store task related items for one or more users, developers, reviewers, managers or other colleagues with authorization to access, view and use the IDE. The tracking module may retrieve issues, tasks, cards, tickets or other objects used to track WIP and the status of a user's work. The retrieval may be from issue tracker systems, version control applications, internal or external databases or other modules within the development module 700. The tracking module 710 may also monitor and log a user's interaction within the IDE. The work performed by the users of the system may be stored, monitored, updated and transmitted both internally and externally. For example, the tracking module 710 may monitor the activity of all users and reviewers within the organization that are using the IDE. This activity may be used to update issue tracking systems with the status of the tickets being worked by the users in real-time. This information may be pushed at predetermined intervals, or at certain checkpoints or milestones in the development process. The tracking module 710 may also provide this information to the task related objects module 711, code review module 712, live view module 713, activity feed module 714 and interface module.

The task related objects module 711 may be used to package and associate information from the tracking module 710 with tickets, tasks or cards that have been pulled from the one or more issue tracker systems. The task related objects module 711 may also include real-time updates to status, changes, modification and user access to the files, tickets or code reviews associated with the task related objects. Code review module 712 may receive a request from a user to create a code review of the user's current WIP. The WIP may have a task related object that contains all the changes and interactions a user has performed related to the pulled task. This includes the files changes, the changes made to the code, branches created, committed and uncommitted code, merge conflicts or other information relevant to the ticket/task/card currently being worked. The code review module 712 may initiate a code review, notify the assigned reviewers of the code review, provide a feedback and communication channel between the reviewers and the user, initiate additional code reviews, create new change requests, create and add new tasks to one or more issue tracking system, approve code reviews, and create pull requests and merge code from within the IDE.

The code review module 712 may allow the user to use jump-to-definition, keybindings, and other IDE tools while conducting a review. The user may create tickets or change requests connected to a block of code, directly from the IDE or within the code review process. Pull requests and merge requests may also be generated directly from within the IDE during development or anytime during a code review. The user may also view pull requests and merge request comments alongside the blocks of code they refer to.

The live view module 713 may receive real-time updates from the tracking module 710, internal and external databases, other modules within the development module 700 and issue tracking systems. The live view module 713 may display these updates, in real-time, to users within the IDE. The live view module 713 may allow for teams and their members to see a live snapshot of the activity of one another. The live view may be sorted or filtered based on user preferences. The live view may be sorted and filtered to show real-time information related to each ticket being worked. The live view may also be sorted and filtered based on files being modified or based on status of the tickets. Live updates to tickets may further be grouped by team or other organizational structure.

Live view module 713 may also be displayed chronologically or any other order as specified by the user. Each user may be displayed in a live view panel, by the live view module 713, along with all WIP, assigned tickets, open reviews, changed files, current files being accessed, or other interaction or status information related to the user and tickets. For example, the live view panel may display each user's name in a list. Under each user's name, there may be a list of the repositories in which they have made local changes (i.e., edits that have not been pushed). Within this list, the actual user edits from their local changes may be displayed for some or all users viewing the live view panel. The user may hover over a repository entry to see the list of files that have changed, and the line number additions and deletions.

The live view module 713 may also display merge conflict alerts. For example, an orange badge on the live view panel or live view panel tab, in a tabbed window IDE, may let the user know if another team member is making changes in a file that the user has also edited, even if it is on another branch or not committed yet.

The activity feed module 714 may display, in an activity feed, modifications and changes as they happen in real-time. The entries in the activity feed are code centric and link to the code associated with the entry. The activity feed may display entities such as requests for feedback, code review requests, change requests or other task related activities. From within the activity feed, a user may select the activity entry and be taken directly to the associated activity (modification to code, code review, feedback request, change request, pull request, merge request or other milestones that result in a status change). The user may perform work on the issue, code or task associated with the activity entry by selecting the entry from within the activity feed.

Interface module 715 may control the display and organization of display elements within the IDE. The interface module 715 may provide a customizable tree-based view that is always available. The tree-based view may comprise sections for pull requests, feedback requests, codemarks, work-in-progress, issues and a team section. More or less sections may be displayed, and the order of the sections may be changed or rearranged by the user.

The pull requests section may display a list of all open pull requests created by the user, assigned to the user, or where the user is a reviewer. The user may add, remove and edit the default queries to create a custom list.

The feedback requests section may comprise official code review requests and more informal feedback requests. Feedback requests may be used more frequently to get feedback on the user's WIP throughout the development process. The feedback requests do not require the user to commit and push just to get early feedback. Feedback requests may be distinguished from formal PR code reviews by name, icon or other visual indication. Feedback requests may be converted at any time into a formal code review. This change may be displayed in the feedback requests section, updated in the live view panel, activity feed, issue tracking system and the tracking module 710. The feedback requests may also be edited or modified in the same manner as a code review.

The codemarks section may display all of the codemarks or comments that annotate the currently selected file or files. These codemarks may have originated in a pull request, a feedback request, or through ad-hoc discussion.

The work-in-progress section may display a summary of the user's local changes and the issue that the user is currently working on. Teammates, colleagues and other users may see this information below the user's name in the team section, activity feed or live view panel.

The issues section may display tickets, tasks and cards from one or more issue tracking systems. The user may see their backlog of issues from the one or more issue tracking systems, together in one place. From within the issues section, the user may update an issue's status, create a feature branch to perform work on the issue, and update the user's status on one or more communications channels, instant messaging services, in the team section, activity feed or live view panel.

The team section may display all members of a user's team, including what they are currently working on. From within the team section the user may invite new members to the team.

The tree-based view may be completely customizable. Each section may be collapsed, expanded, maximized, resized or hidden. The user may use drag-and-drop to reorder the sections. The default order, from bottom to top, may represent a typical developer's workflow. The typical developer's workflow may start with an issue. Therefore, the tree-based view may let teammates track a user's WIP, use ad-hoc discussion with codemarks to ask questions, request feedback on the user's WIP at any time during development, initiate a code review and create a pull request.

Figure 8:
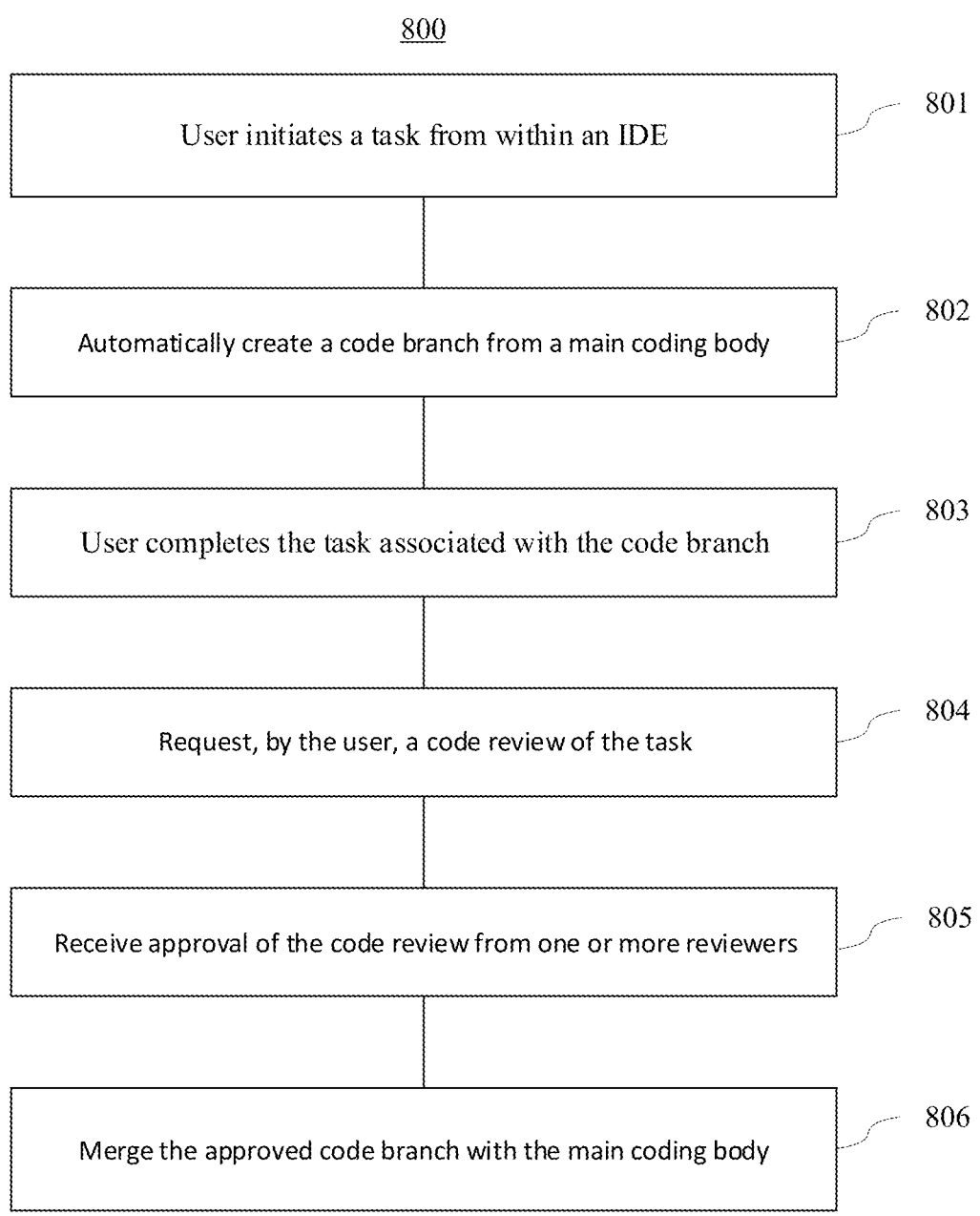
FIG. 8 shows an example of an overview of a process for requesting a code review in accordance with aspects of the present disclosure.

FIG. 8 shows an example of an overview of a process for requesting a code review in accordance with aspects of the present disclosure.

At step 801, the user initiates a task from within an IDE. The task may be a ticket, card, issue, feature request or change request. The task be selected from a list of tasks or created by the user from within the IDE. The list of tasks may be retrieved from one or more issue tracking systems. The user may be presented a list of tasks assigned to the user or the user may perform a search in order to find and select the task.

At step 802, the system may automatically create a code branch from a main coding body. The code branch may be a feature branch created for the user to perform their work on. The creation of the coding branch may result in the updating of the status of the task in the one or more issue tracking systems, team section of the IDE, activity feed and live view panel. The branch may be automatically named based on the title and/or description of the task. The user may customize the naming convention of the created branches, and the branches may be named based on tokens such as username, team name, task ID and date.

At step 803, the user completes the task associated with the code branch. The task may alternatively be partially completed and a feedback request on the partially completed task may be requested. The user may receive feedback from the reviewer, make changes to the code and submit additional feedback requests until the task has been completed. The feedback requests may be iterated as many times as needed until the task is ready for a formal code reviews.

At step 804, the user may request a code review of the task. The code review may be requested or initiated, conducted and finalized from within the IDE. The code review module 712 may package up all of the changes on the user's current branch and allow the user to decide which files to submit for review. The code review may include code that has not been committed or pushed. This allows a user to ask for a review of code in any state.

Notifications that a code review has been initiated may be displayed in the activity feed, sent in an email or delivered via a toast notification. All of the user's teammates may be able to see that a code review has been initiated, and the requested reviewer(s) will be notified via email. The user may also choose to share the code review with other users through one or more communications channels, instant messaging applications or email. The notification for code reviews may be based on whether or not a user follows the reviewer, the user, or the code file or feature/ticket the code review is associated with.

The code review may be performed by the one or more reviewers from within the IDE. The reviewer may click on any file in the Changed Files section of the code review to review the changes. The reviewer may be presented with a diff in their IDE. The reviewer may choose to step through the changes in the file during their review. The reviewer may navigate the stepping through by using the up and down arrows or other navigation instructions. The reviewer may comment, discuss, approve or reject the code review without leaving their IDE.

At step 805, the system may receive approval of the code review from one or more reviewers. Once approved, the user may create a pull request from the code review, without leaving the IDE. The pull request may also include summary information about the code review, including a permalink to the review. The permalink, along with the summary information may be stored to maintain an audit trail of the entire process.

At step 806, the system may merge the approved code branch with the main coding body. Upon approval, the reviewer may select commit and push for approved changes and the changes may then be merged into the main code.

Figure 9:
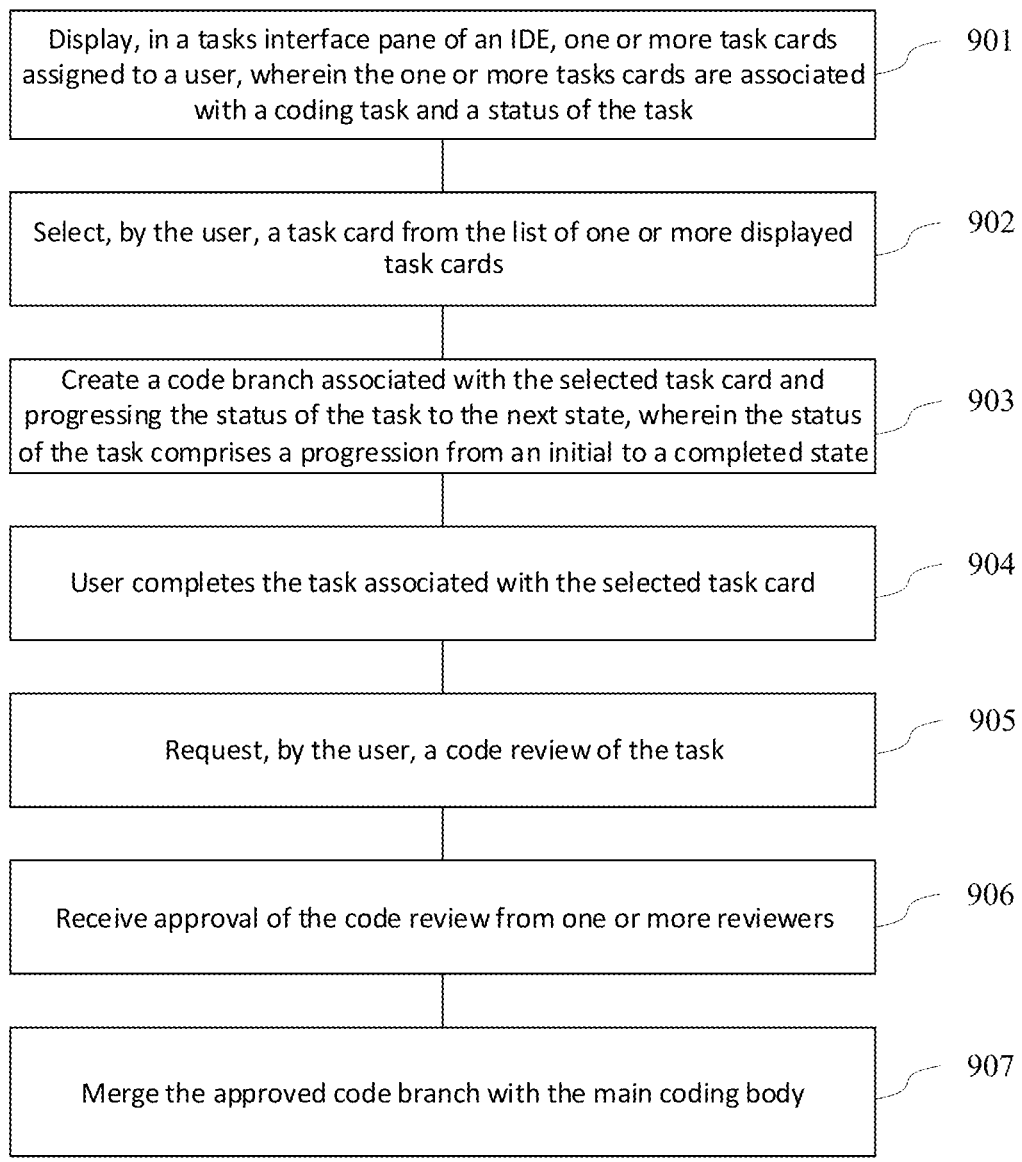
FIG. 9 shows an example of an overview of a process for a coding workflow in accordance with aspects of the present disclosure.

FIG. 9 shows an example of an overview of a process for a coding workflow in accordance with aspects of the present disclosure.

At step 901, the system may display, in a tasks interface pane of an IDE, one or more task cards assigned to a user, wherein the one or more tasks cards are associated with a coding task and a status of the task. The one or more task cards may be retrieved from one or more issue tracking systems.

At step 902, the user may select a task card from the list of one or more displayed task cards. Upon selection of the task card, details of the coding task associated with the task card may be displayed to the user. The selection of the task initiates the start of a workflow process at step 903.

At step 903, the system may create a code branch associated with the selected task card and progressing the status of the task to the next state. The status may be changed from a pending or initial default status assigned to newly created tasks, to an in progress status or other status to represent the current progress of the task. The system may track and update the status of the task throughout the entire development progression, from an initial to a completed state.

Steps 904-907 are similar to those of steps 803-806 of FIG. 8 and will not be described for the sake of brevity.

Figure 10:
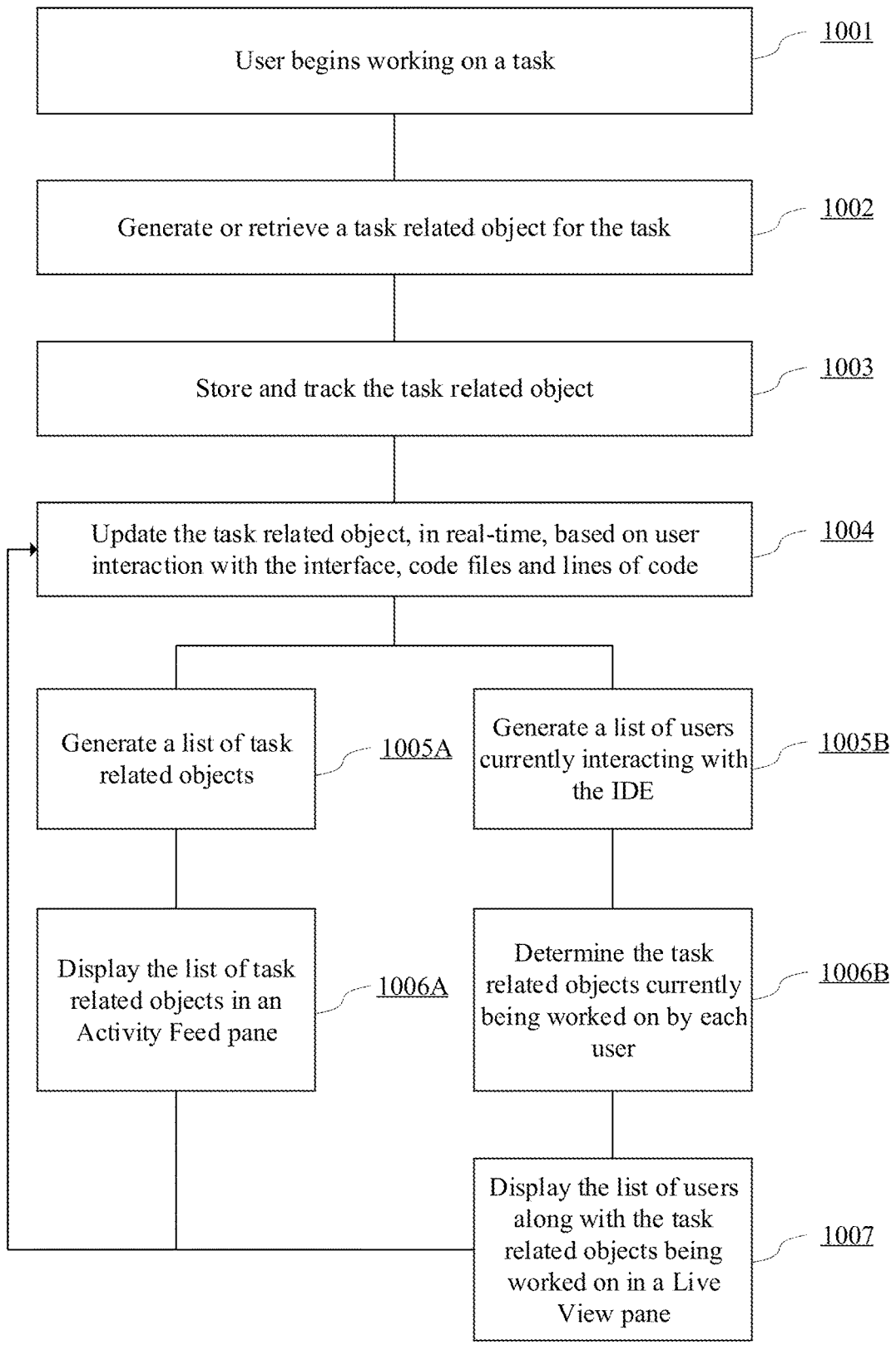
FIG. 10 shows an example of an overview of a process for tracking user activity and tasks in accordance with aspects of the present disclosure.

FIG. 10 shows an example of an overview of a process for tracking user activity and tasks in accordance with aspects of the present disclosure.

At step 1001, the user begins working on a task. The task may be selected from a list of tasks assigned to the user. The tasks may be pulled from one or more issue tracking systems or version control systems.

At step 1002, the system may generate or retrieve a task related object for the task. If a task related object has not been created for the task, the system may generate an object or entity associated with the selected task. The task related object may comprise information related to the task, the user working on the task, status of the task and interactions of one or more users with files and code related to the task.

At step 1003, the system may store and track the task related object. All interaction of the user with files and code related to the selected task may be monitored, tracked and stored in a log or audit trail. Interactions of other users with files and code associated with the selected task may also be monitored, logged and tracked to identify possible merge conflicts.

At step 1004, the system may update the task related object, in real-time, based on user interaction with the interface, code files and lines of code. Real-time updates may be obtained through monitoring of one or more users and the monitoring of files and code associated with one or more tasks. The system may monitor based on the task related objects themselves, the users of the system or combination thereof.

At step 1005A, the system may generate a list of task related objects and the list of objects may then be used in displaying to one or more users of the system, real time updates of current WIPs.

At step 1006A, the system may display the list of task related objects in an activity feed pane. Activity feed inside IDE, keeps track of everything that has been done in the code. Code specific. Every time a user interacts with, modifies or comments on a file or code, the event is populated in the activity feed. Any user may can click and open the event and see information relating to the event and the exact interactions, modifications or comments that resulted in the creation of the event. The event is not just an update on something that has happened, it is linked to the code it refers to. The activity feed may be attached to code items directly. Events such as a user requesting a code review generates an event in activity feed. The activity feed may show the status (open, approved), who can approve the event and other information related to the event. The user may select an event from the activity feed. The selection opens the event in the feed, and it takes the user directly to that event and allows the user to perform actionable tasks related to the event.

At step 1005B, the system may generate a list of users currently interacting with the IDE. The list of users may be used to display their activities and a real-time live view of work being performed on the system.

At step 1006B, the system may determine the task related objects currently being worked on by each user.

At step 1007, the system may display the list of users along with the task related objects being worked on in a live view pane. The live view pane may allow all users of the system or members of a development team to see what each other are working on in real-time. A user may click on any of the entries and get information on the user or task they are working on. These real-time updates to what is being worked on may allow for a user to view the WIP task, the changes made, the files changes, as well as select and jump into the file and see what has been changed or edited. The user may also view any comments associated with the file that they jumped into, as well as leave responses to the comments or additional comments to other parts of the code. Live view may be turned on by individual users or by a manager of the users of the system. The system may frequently refresh to show local changes of the user in the live view. A user may hover over a user, task related object, changed file, comments, code changes or other information displayed, in association with a user, to show more detail or expand the view of the user. A user may also select a user from the list to see the file that they are currently working on. From the lice view pane, a supervisor, manager, reviewer or any authorized user of the system may see a list of all users currently working within the system and the work that they are currently working on. Any of the users in the list may be selected to be taken to the exact file and line of code within the file to see the work being performed in real-time. The system may also duplicate/mirror the IDE view of the selected user, so as to allow the supervisor, manager, reviewer or authorized user to see the task and development in context and as a whole. The supervisor, manager, reviewer or authorized user may also choose to step through previous tracked changes or interactions in order to get a better grasp on the current change. Since all changes and interactions are tracked, the supervisor, manager, reviewer or authorized user may replay or step through all work a user has performed on a task/ticket/WIP. The tracking may include open tabs, mouse input, keyboard input, switching of views, files and code viewed, files opened, interactions with external systems, web searches, communication channel messages or other interactions or communications. A user may also perform searches from internal or external knowledge bases when searching for possible solutions to a WIP, issue, bug or feature. The search may be performed through a search engine, and results may be web pages indexed by the search engine. The search results may be filtered to only show information from trusted sources. The in-IDE search may also show excerpts from portions of the one or more results that are relevant, allowing a user to view only the information and code examples that are relevant to the task that they are working. The user may also select a portion of code to use as a search parameter. Searching for the selected portion of code may allow for other examples of implementation of similar features to be provided to the developer.

In some embodiments, code reviews allow for comments to be made by both the reviewers and the user. Comments may be packaged with the code review. The reviewer can add comments about the code submitted for review. During the code review process, the reviewer may also select additional code to comment on. The additional code may be from locations other than the requested code review locations, and the comments associated with that code may be attached to the code review being worked on by the reviewer.

The reviewer may also generate a new task for the coder to perform that is related to the current task being reviewed. The reviewer may select the additional code which needs to be modified or corrected, create a comment associated with the additional code and instruct the coder on the modifications/corrections needed, and return the code review object to the coder with the additional task, code, and comments attached. The reviewer may be able to require that the additional task be completed before the code review may be approved even though the additional task was not originally part of the code review.

The modifying of the code review object may be performed in real-time. Addition of comments and tasks as well as the rejection or approval of the code review by the reviewer modifies the code review object in real-time. The modifying of the code review object by the coder or the reviewer may result in the real-time updating of the live view of the coders, entries in the activity feed, and status/comments in internal or external task management or issue trackers.

Figure 11:
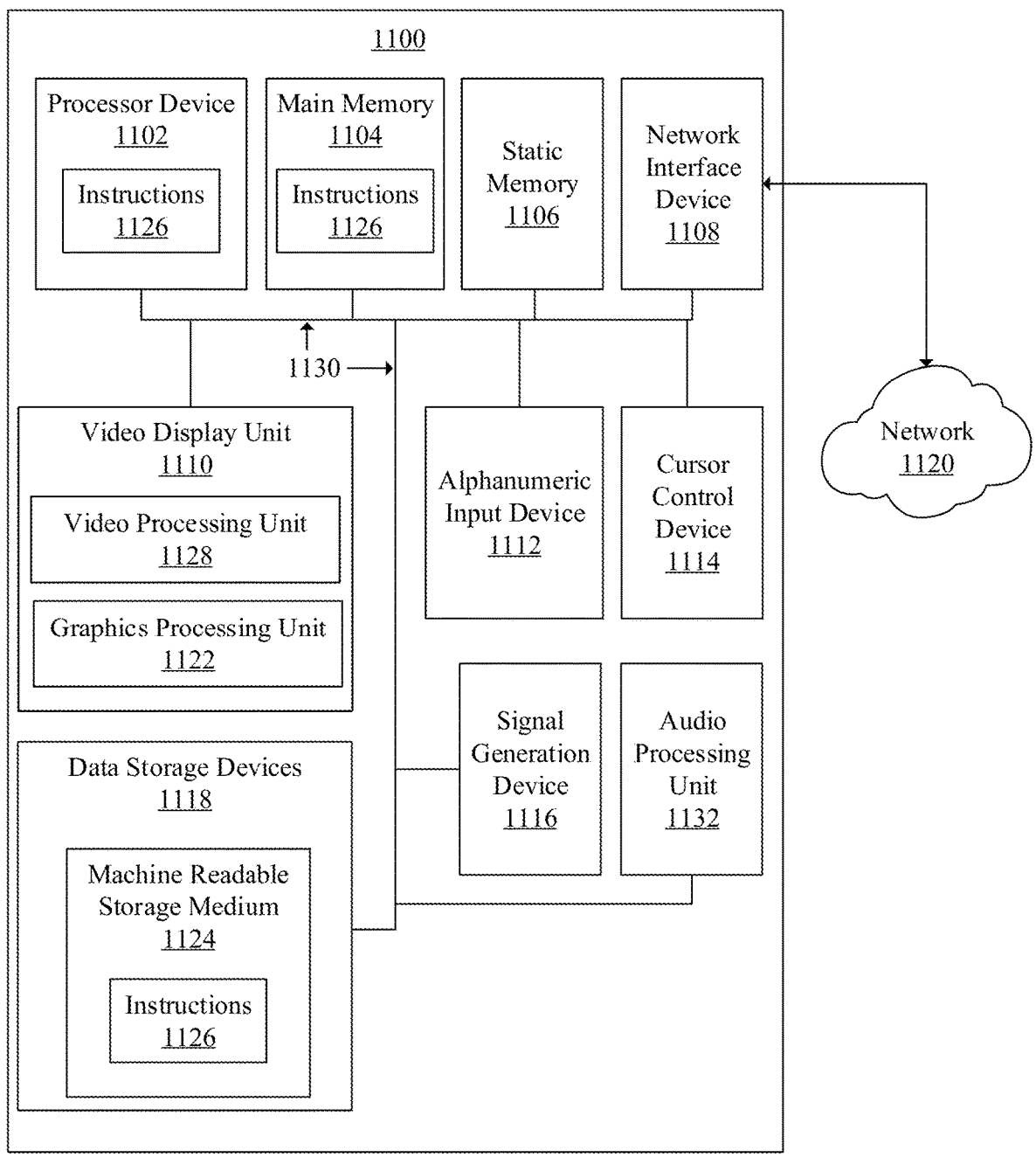
FIG. 11 is a diagram illustrating an exemplary computer that may perform processing in some embodiments and in accordance with aspects of the present disclosure.

FIG. 11 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1126 include instructions to implement functionality corresponding to the components of a device to perform the disclosure herein. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system for augmenting an integrated development environment (IDE), the system comprising:
   at least one processor operatively connected to a memory;
   an IDE, executed by the at least one processor;
   a development module, executed by the at least one processor, configured to manage access to a code repository and version control application, wherein the development module comprises:
      a tracking module, executed by the at least one processor, configured to store one or more task related objects;
      an interface module, executed by the at least one processor, configured to generate a task management panel in conjunction with a code editing panel, wherein the task management panel is configured to display task related actions selectable by a first user;
      wherein the interface module is further configured to:
         receive a selection of a task related action from the first user;
         generate or retrieve a task related object associated with the selected task related action; and
         update, in the tracking module, the task related object with information relating to one or more interactions of the first user with one or more code files, one or more lines of code, and comments associated with a task;
      a code review module, executed by the at least one processor, configured to:
         receive a request from the first user to initiate a code review associated with the first task related object, wherein the code review comprises:
            packaging one or more code files, one or more lines of code, one or more difference sets, comments, and one or more user selected additional code files or lines of code;
            selecting, by the first user, one or more reviewers to assign the code review to; and
            submitting the code review for approval to the one or more reviewers;
         wherein the code review associated with the task related object is initiated from within and without leaving the IDE; and
         wherein the reviewing of the code review associated with the task related object is performed by the one or more reviewers from within and without leaving the IDE.

2. The system of claim 1, further comprising a live view module, executed by the at least one processor, configured to: generate a list of users, including the first user and one or more second users; instructing the interface module to display the list of users; and instructing the interface module to display one or more task related objects associated with each user of the list of users.

3. The system of claim 2, wherein the list of users is selectable;
   wherein a selection of a user from the list of users causes the display of one or more first information items relating to that user;

wherein a selection of a task related object associated with a user of the list of users causes the display of one or more second information items relating to the task related object; and wherein a selection of a selected information item, from the displayed one or more first and second information items, results in the navigation of the IDE to a code file, line of code, or comments associated with the selected information item.

4. The system of claim 1, wherein the one or more task related objects comprise:
   a description of a task associated with the task related object;
   one or more code files that have been modified or require modification;
   a record of user based modification, addition or deletion of one or more lines of code from the one or more code files; and
   comments associated with the task, one or more code files or modifications to lines of code.

5. The system of claim 1, wherein the tracking module is further configured to:
   store a list of the one or more task related objects, wherein the one or more task related objects are associated with the first user and one or more second users; and
   update the one or more task related objects, in real-time, based on the interaction of the first user or one or more second users with the one or more task related objects.

6. A computer implemented method for augmenting an integrated development environment (IDE), the method comprising:
   displaying, by a display device, an IDE to a first user;
   managing, by a development module, executed by at least one processor, access to a code repository and a version control application;
     storing, by a tracking module, one or more task related objects;
     generating, by an interface module, a task management panel in conjunction with a code editing panel, wherein the task management panel is configured to display task related actions selectable by a first user;
   wherein the task management panel is further configured to:
     receive a selection of a task related action from the first user;
     generate or retrieve a task related object associated with the selected task related action; and
     update, by the tracking module, the task related object with information relating to the interaction of the first user with one or more code files, one or more lines of code, and comments associated with a task;
   receiving a request from the first user to initiate a code review associated with the task related object, wherein the code review comprises:
     packaging one or more code files, one or more lines of code, one or more difference sets, comments, and one or more user selected additional code files or lines of code;
     selecting, by the first user, one or more reviewers to assign the code review to; and
     submitting the code review for approval to the one or more reviewers;
   wherein the code review associated with the task related object is initiated from within and without leaving the IDE; and wherein the reviewing of the code review associated with the task related object is performed by the one or more reviewers from within and without leaving the IDE.

7. The method of claim 6, further comprising:
   generating, by a live view module, a list of users, including the first user and one or more second users; displaying, by the interface module, the list of users; and
   display one or more task related objects associated with each user of the list of users.

8. The method of claim 7, wherein selecting a user from the list of users causes the display of one or more first information items relating to that user;
   wherein selecting a task related object associated with a user of the list of users causes the display of one or more second information items relating to the task related object; and
   wherein selecting a selected information item, from the displayed one or more first and second information items, results in the navigation of the IDE to a code file, line of code, or comments associated with the selected information item.

9. The method of claim 6, wherein the one or more task related objects comprise:
   a description of a task associated with the task related object;
   one or more code files that have been modified or require modification;
   a record of user based modification, addition or deletion of one or more lines of code from the one or more code files; and
   comments associated with the task, one or more code files or modifications to lines of code.

10. The method of claim 6, further comprising:
    storing a list of the one or more task related objects, wherein the one or more task related objects are associated with the first user and one or more second users; and
    updating the one or more task related objects, in real-time, based on the interaction of the first user and the one or more second users with the one or more task related objects.

11. A non-transitory computer-readable medium comprising instructions which, when executed by a computer, cause the computer to carry out a method comprising:
    displaying, by a display device, an IDE to a first user;
    managing, by a development module, executed by at least one processor, access to a code repository and a version control application;
      storing, by a tracking module, one or more task related objects;
      generating, by an interface module, a task management panel in conjunction with a code editing panel, wherein the task management panel is configured to display task related actions selectable by a first user;
    wherein the task management panel is further configured to:
      receive a selection of a task related action from the first user;
      generate or retrieve a task related object associated with the selected task related action; and
      update, by the tracking module, the task related object with information relating to the interaction of the first user with one or more code files, one or more lines of code, and comments associated with a task;
    receiving a request from the first user to initiate a code review associated with the task related object, wherein the code review comprises:

packaging one or more code files, one or more lines of code, one or more difference sets, comments, and one or more user selected additional code files or lines of code;

selecting, by the first user, one or more reviewers to assign the code review to; and submitting the code review for approval to the one or more reviewers;

wherein the code review associated with the task related object is initiated from within and without leaving the IDE; and wherein the reviewing of the code review associated with the task related object is performed by the one or more reviewers from within and without leaving the IDE.

12. The non-transitory computer-readable medium of claim 11, further comprising instructions configured for:
generating, by a live view module, a list of users, including the first user and one or more second users;

displaying, by the interface module, the list of users; and display one or more task related objects associated with each user of the list of users.

13. The non-transitory computer-readable medium of claim 12, wherein selecting a user from the list of users causes the display of one or more first information items relating to that user;

wherein selecting a task related object associated with a user of the list of users causes the display of one or more second information items relating to the task related object; and wherein selecting a selected information item, from the displayed one or more first and second information items, results in the navigation of the IDE to a code file, line of code, or comments associated with the selected information item.

14. The non-transitory computer-readable medium of claim 11, wherein the one or more task related objects comprise:

a description of a task associated with the task related object;

one or more code files that have been modified or require modification;

a record of user based modification, addition or deletion of one or more lines of code from the one or more code files; and comments associated with the task, one or more code files or modifications to lines of code.

15. The non-transitory computer-readable medium of claim 11, further comprising:

storing a list of the one or more task related objects, wherein the one or more task related objects are associated with the first user and one or more second users; and updating the one or more task related objects, in real-time, based on the interaction of the first user and the one or more second users with the one or more task related objects.

\* \* \* \* \*